(12) United States Patent
Anei

(10) Patent No.: US 8,135,826 B2
(45) Date of Patent: Mar. 13, 2012

(54) INFORMATION PROCESSING SYSTEM

(75) Inventor: Shin Anei, Takarazuka (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 115 days.

(21) Appl. No.: 12/080,533

(22) Filed: Apr. 3, 2008

(65) Prior Publication Data
US 2008/0250102 A1 Oct. 9, 2008

(30) Foreign Application Priority Data

Apr. 6, 2007 (JP) .................................. 2007-100546

(51) Int. Cl.
*G06F 15/173* (2006.01)
*G06F 15/16* (2006.01)
(52) U.S. Cl. ........................ 709/224; 709/203; 709/219
(58) Field of Classification Search ........................ None
See application file for complete search history.

(56) References Cited

U.S. PATENT DOCUMENTS

| | | | | |
|---|---|---|---|---|
| 5,146,439 A * | 9/1992 | Jachmann et al. | ......... | 369/25.01 |
| 6,507,914 B1 * | 1/2003 | Cain et al. | ....................... | 726/35 |
| 7,000,015 B2 * | 2/2006 | Moore et al. | .................. | 709/224 |
| 7,353,179 B2 * | 4/2008 | Ott et al. | ............................ | 705/3 |
| 7,584,103 B2 * | 9/2009 | Fritsch et al. | ................. | 704/257 |
| 7,617,093 B2 * | 11/2009 | Ramsey | ........................... | 704/10 |
| 7,793,217 B1 * | 9/2010 | Kim et al. | ..................... | 715/255 |
| 2002/0021828 A1 * | 2/2002 | Papier et al. | .................. | 382/128 |
| 2003/0065716 A1 * | 4/2003 | Kyusojin | ....................... | 709/203 |
| 2003/0135393 A1 * | 7/2003 | Burgess | .............................. | 705/3 |
| 2004/0122705 A1 * | 6/2004 | Sabol et al. | ....................... | 705/2 |
| 2004/0193449 A1 * | 9/2004 | Wildman et al. | .................. | 705/2 |
| 2006/0235861 A1 | 10/2006 | Yamashita et al. | | |
| 2007/0061393 A1 * | 3/2007 | Moore | ........................... | 709/201 |

FOREIGN PATENT DOCUMENTS

JP 2006-268405 A 10/2006

* cited by examiner

*Primary Examiner* — John B. Walsh
(74) *Attorney, Agent, or Firm* — Brinks, Hofer, Gilson & Lione

(57) ABSTRACT

The present invention provides a technique capable of generating and providing information in which various elements are associated with one another in accordance with situations. An information processing system has a server and a plurality of terminals. Each of the terminals obtains element associated information obtained by associating elements belonging to items included in a plurality of element items and transmits the element associated information to the server. The server receives the element associated information from each of the terminals. In the case where one or more terminals included in the plurality of terminals satisfies a specific condition, the server generates network information obtained by associating elements belonging to the items between the items on the basis of one or more pieces of element associated information received from the one or more terminals.

15 Claims, 16 Drawing Sheets

RADIOLOGICAL REPORT

G1

| ORDER — A1 | REPORT GENERATION — A4 |
| --- | --- |
| TEST LIST — A2 | |
| TEST INFORMATION — A3 | |

Buttons: RETRIEVE, ADD, DELETE, REMARK REGISTER, MEMO REGISTER — A8, A6

REMARK — A5
IN T1 IMAGE, HIGH SIGNAL IS RECOGNIZED IN FRONTAL LOBE, AND INFARCTION IS SUSPECTED.

MEMO

IMAGE — A7

F I G. 1 3

| TEST LIST | | | |
|---|---|---|---|
| PATIENT NAME | SEX | TEST ID | STATE |
| TARO TOKKYO | M | tokkyo | NOT YET |
| . | | | |
| . | | | |
| . | | | |
| . | | | |

F I G. 1 4

ORDER

20S, MALE. HE CAME HERE DUE TO HIS
ADVANCING FORGETFULNESS.
PLEASE CHECK HIS HEAD WITH MR.

F I G. 1 5

| TEST INFORMATION | |
|---|---|
| ATTRIBUTE | VALUE |
| PATIENT ID | 593819-5 |
| PATIENT NAME | HANAKO TOKKYO |
| SEX OF PATIENT | M |
| BIRTHDAY | FEBRUARY, 2020 |
| TEST ID | tokkyo |
| STATE | NOT YET |
| IMPORTANCE | IMPORTANT |
| RECEPTION NUMBER | 234759 |
| REGION | SKULL |
| MODALITY | MRI |
| THE NUMBER OF IMAGES | 20 |
| IMAGING PARAMETERS | T2,FLAIR IMAGE |

FIG. 17

TP1 REPORT GENERATION

<CONDITION NARROWING>

① REGION CLASSIFICATION : ⟵ PL1
HEAD (SKULL) · · · · · · ▶

⇧

② MODALITY : ⟵ PL2
MRI
CT
· ·

⇧

③ SEX : ⟵ PL3
MALE ⟵ MP
FEMALE

CONDITION DETERMINATION ⟵ BT

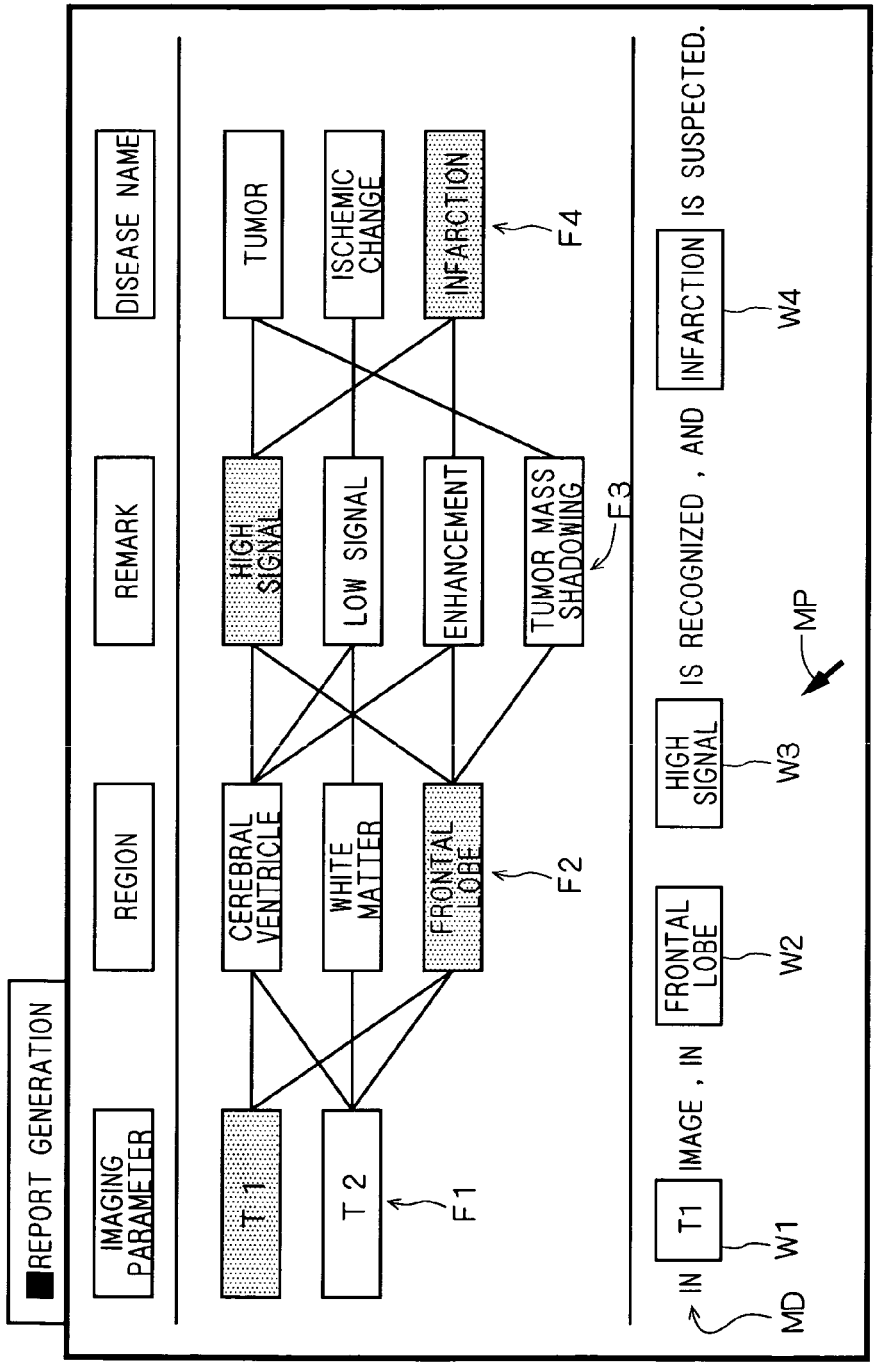

INFORMATION PROCESSING SYSTEM

This application is based on application No. 2007-100546 filed in Japan, the contents of which are hereby incorporated by reference.

BACKGROUND OF THE INVENTION

1. Field of the Invention

The present invention relates to a system for processing information.

2. Description of the Background Art

In the case of generating various reports using knowledge stored in the past, hitherto, it is necessary to retrieve a past report and refer to the content of the report by any method. In the case where a past report is constructed by using a template or the like, it is unnecessary to refer to the full text of the retrieved report. However, the relations among reports and the like have to be found out with reference to a huge amount of data.

For example, at the time of generating a so-called radiological report in a medical institution, when data is entered using a free format, usage of abbreviations, phrases, and the like largely vary among doctors in the department of radiology. It is therefore not easy to read radiological reports of other doctors. At the time of generating a radiological report of the same case, it is difficult to perform a work of generating a radiological report by referring to a radiological report of another doctor in the department of radiology.

Such a problem is not limited to the case of generating a radiological report but generally occurs in generation of various documents such as various reports and various scenarios.

To address the problem, a technique of extracting a value in accordance with a demand of a customer and supporting writing of an appealing scenario including a requirement and a solution is proposed (for example, Japanese Patent Application Laid-Open No. 2006-268405).

The technique proposed in Japanese Patent Application Laid-Open No. 2006-268405 is as follows. A value, a requirement, a solution, and the like are expressed as nodes, and the causal relations among them are preliminarily held as data (causal relation data). At the time of examining a proposal for a customer, nodes having the causal relation with a specific node are retrieved from the causal relation data, proper nodes are selected from the retrieved nodes, a requirement having the causal relation with a selected requirement is also retrieved as necessary, and a proper node is selected from the retrieved nodes. By repeating such operations, a scenario to be proposed is generated. Although the causal relation data is generated from known information in advance, it is also possible to define and add a new node and a new causal relation.

However, since the entire causal relation data is to be retrieved in the technique proposed in the patent document, a large amount of information related to a number of nodes other than a node to be selected is presented according to the situations. Consequently, the possibility that it takes time and effort to select or enter a node and an error occurs is high. For example, in the case where causal relation data is constructed by mixture of information of customers in quite different classes, there is high possibility that it takes time and effort to select or enter a node and an error occurs at the time of generating a scenario adapted to the class of actual customers.

Such a problem commonly occurs in the case of referring to information obtained by associating various elements with one another such as cases of generating various documents with reference to elements such as words.

SUMMARY OF THE INVENTION

The present invention is directed to an information processing system.

According to the invention, the information processing system has a server and a plurality of terminals. Each of the terminals includes: an obtaining unit for obtaining element associated information obtained by associating elements belonging to items included in a plurality of element items; and a transmitting unit for transmitting the element associated information to the server. The server includes: a receiving unit for receiving the element associated information from each of the terminals; and a network information generating unit, in the case where one or more terminals included in the plurality of terminals satisfies a specific condition, for generating network information obtained by associating elements belonging to the items between the items on the basis of one or more pieces of element associated information received from the one or more terminals.

With the configuration, the information obtained by associating various elements with one another can be generated and provided according to situations.

According to another aspect of the present invention, the information processing system has a server and a plurality of terminals. Each of the terminals includes: an obtaining unit for obtaining element associated information obtained by associating elements belonging to items included in a plurality of element items; and a transmitting unit for transmitting the element associated information to the server. The server includes: a receiving unit for receiving the element associated information from each of the terminals; and a network information generating unit for generating first network information obtained by associating elements belonging to the items between the items on the basis of one or more pieces of element associated information received from one or more terminals satisfying a first specific condition included in the plurality of terminals, and for generating second network information obtained by associating elements belonging to the items between the items on the basis of one or more pieces of element associated information received from one or more terminals satisfying a second specific condition included in the plurality of terminals.

With the configuration, the information obtained by associating various elements with one another can be generated and provided according to situations.

Therefore, an object of the present invention is to provide a technique capable of generating and providing information obtained by associating various elements with one another in accordance with situations.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a diagram showing a data configuration of a support information DB;

FIG. 12 is a diagram illustrating a radiological report input screen;

FIG. 13 is a diagram showing a visible output of test list information;

FIG. 14 is a diagram showing a visible output of ordering information;

FIG. 15 is a diagram showing a visible output of attribute information related to a patient's attribute and a test attribute;

FIG. 17 is a diagram showing an extraction condition determination template;

FIG. 19 is a diagram showing a display example of an input support template.

DESCRIPTION OF THE PREFERRED EMBODIMENTS

Embodiments of the present invention will be described below with reference to the drawings.

Schematic Configuration of Information Processing System

Figure 1:
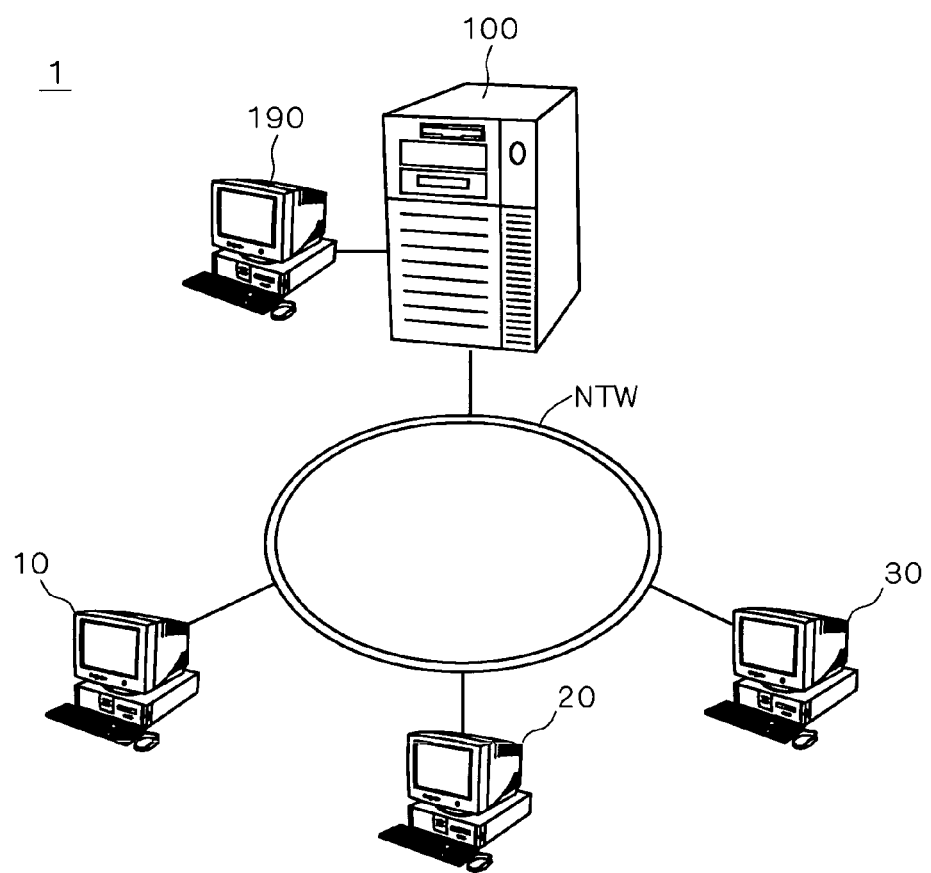
FIG. 1 is a diagram showing a schematic configuration of an information processing system as a first embodiment of the present invention.

FIG. 1 is a diagram showing a schematic configuration of an information processing system 1 as an embodiment of the present invention.

The information processing system 1 has a server 100, terminals (clients) 10, 20, and 30, and a server management terminal 190. The server 100 and the terminals (clients) 10, 20, and 30 are connected to one another so as to transmit/receive data via a network line NTW such as the Internet. The server management terminal 190 for managing the server 100 is connected to the server 100. Although the example in which the three terminals 10 to 30 exist will be described, the number of terminals may be two or more.

The terminals 10, 20, and 30 are mounted in hospitals. For example, the terminal 10 is mounted in a first hospital, the terminal 20 is mounted in a second hospital, and the terminal 30 is mounted in a third hospital. Since the terminals 10, 20, and 30 have similar configurations, hereinbelow, the terminal 30 will be employed as a representative example and described.

In the terminal 30, a diagnosis information DB 341 (which will be described later) storing a number of pieces of image data is stored in a built-in storage unit 34 (which will be described later). The number of pieces of image data is obtained by image capturing using radiation performed on patients in a test list in department of radiology. In the terminal 30, for example, a reading physician in the department of radiology writes and enters a radiological report while properly referring to image data visibly output and can store information indicative of the radiological report (radiological report information) in the diagnosis information DB 341. That is, the terminal 30 can function as a report input device for inputting a radiological report.

Figure 2:
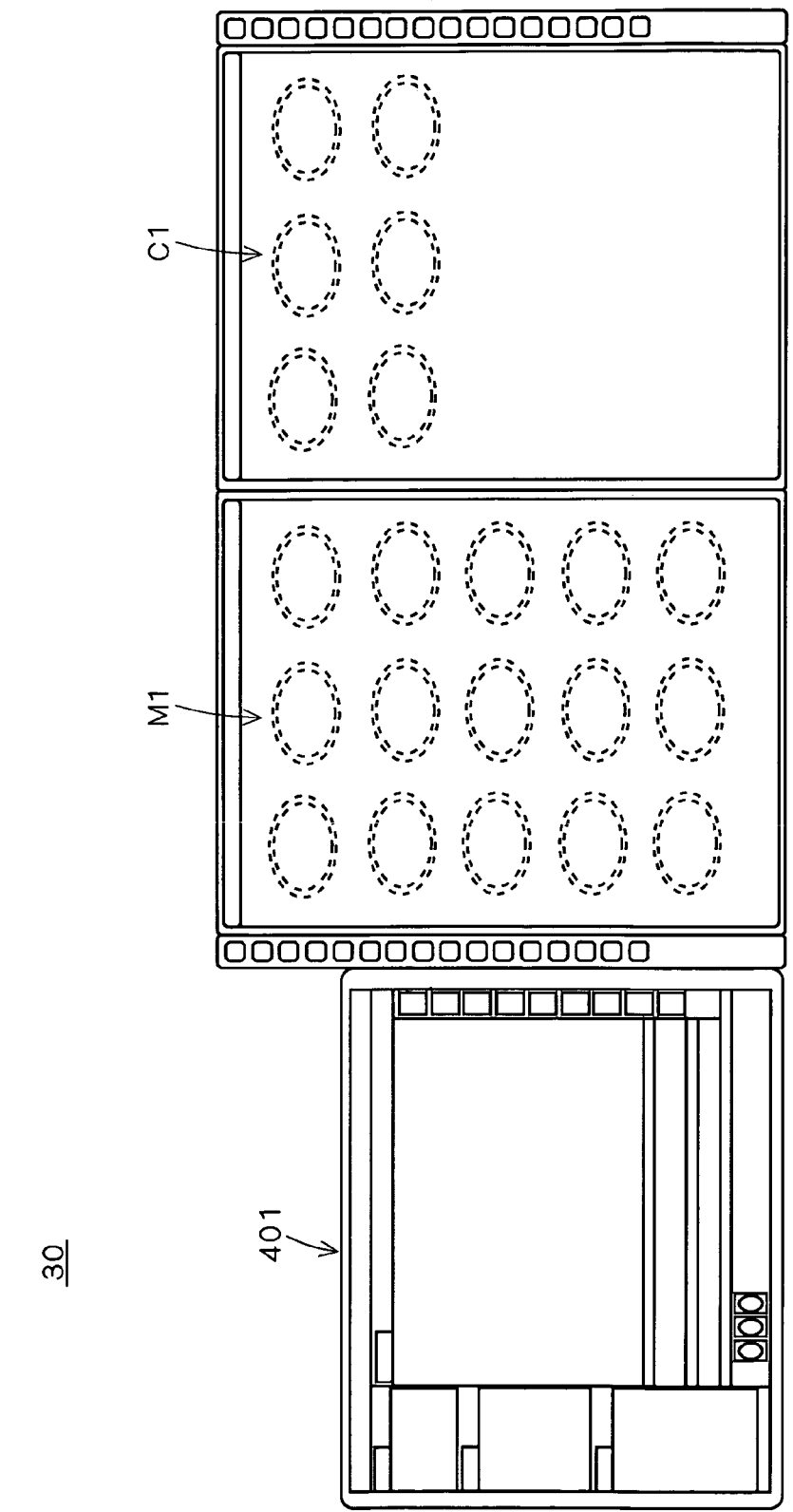
FIG. 2 is a diagram showing a state where a new radiological report is written and input at a terminal.

FIG. 2 illustrates a state where a new radiological report is written and entered in the terminal 30. As shown in FIG. 2, in the terminal 30, a reading physician of the department of radiology can enter a new radiological report on an input screen 401 of the radiological report by properly referring to screens (image display screens) M1 and C1 to which image data of a patient stored in the diagnosis information DB 341 is visibly output.

The terminals 10, 20, and 30 generate information in which a plurality of elements constructing a radiological report are structured so as to be associated on the radiological report unit basis (hereinbelow, also called "single-report element associated information"), and transmit the information to the server 100. The function of generating the single-report element associated information from radiological report information in the terminals 10, 20, and 30 will be called "associated-information generating function" hereinbelow.

On the other hand, the server 100 collects the single-report element associated information transmitted from the terminals 10, 20, and 30 and, according to the specialties of the hospitals in which the terminals 10, 20, and 30 are mounted, and distinguishes the radiological report information. Information (input support information) for supporting input of a new radiological report is generated by using the single-report element associated information classified by specialty, and distributed to the terminals 10, 20, and 30. The function of generating the input support information by specialty in the server 100 will be called a "support information generating function" hereinbelow. The function of distributing the input support information by specialty properly to the terminals 10, 20, and 30 in the server 100 will be called an "information distributing function" hereinbelow.

In the terminals 10, 20, and 30 that obtain the input support information which varies by specialty, by extracting necessary information from the input support information which varies by specialty and presenting the extracted information in the form of a template, a new radiological report can be easily generated in consideration of the situations such as specialty. The function of supporting entry of a new radiological report in the terminals 10, 20, and 30 will be called an "input supporting function" hereinbelow.

As described above, from the viewpoint of generating the input support information, it can be said that the information processing system 1 functions as a system of constructing a database (database construction system). From the viewpoint of using the input support information, it can be said that the information processing system 1 functions as a database system. Further, from the viewpoint of supporting entry by using the input support information, it can be also said that the information processing system 1 functions as a reporting system.

The functions of the information processing system 1 will be sequentially described mainly as the associated-information generating function, the support information generating function, the information distributing function, and the input support function.

Associated Information Generating Function

Figure 3:
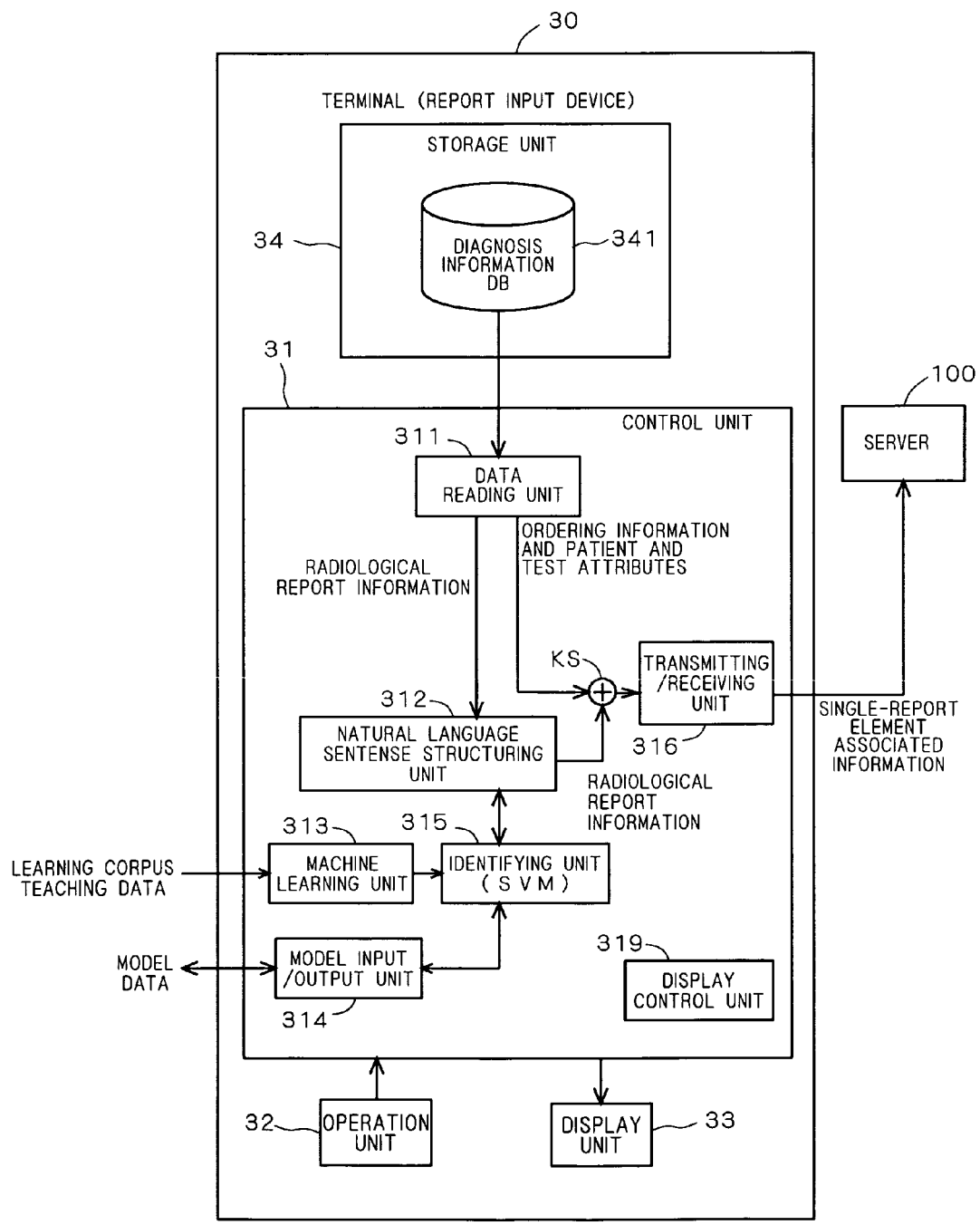
FIG. 3 is a block diagram showing a functional configuration of an associated information generating function.

FIG. 3 is a block diagram showing a function configuration of the associated-information generating function realized mainly by the terminal 30.

The terminal 30 has a control unit 31, an operation unit 32, a display unit 33, and the storage unit 34.

The control unit 31 has a CPU, a ROM, a RAM, and the like. The CPU reads and executes a program stored in the storage unit 34, thereby realizing various functions such as the associated-information generating function. In the control unit 31, various data temporarily generated in various information processes is temporarily stored in a built-in RAM.

The operation unit 32 has a keyboard, a mouse, and the like and can enter various information to the control unit 31 in response to an operation of the user.

The display unit 33 has a liquid crystal display screen, a CRT, and the like and visibly outputs various images under control of a display control unit 319 in the control unit 31.

The storage unit 34 is constructed by a hard disk and the like and stores various programs and data.

In the storage unit 34, the diagnosis information database (DB) 341 storing medial information (hereinbelow, also called "diagnosis information") of a number of patients to be diagnosed is stored.

The diagnosis information DB 341 includes a list (test list) of a number of patients to be diagnosed. In the diagnosis information DB 341, a number of pieces of image data obtained by image capturing using radiation performed on patients in a test list in department of radiology and information indicative of radiological reports (radiological report information) corresponding to the number of pieces of image data are stored so as to be associated with the names of the patients in the test list. When attention is paid to the point that a number of pieces of radiological report information are stored, the diagnosis information DB 341 is a database (report DB) in which a number of pieces of radiological report information are stored. Further, in the test list included in the diagnosis information DB 341, attribute information indicative of information related to orders from doctors in charge, patients, and tests is stored so as to be associated with the names of the patients in the test list.

The control unit 31 has, as functional configurations related to the associated information generating function, a data reading unit 311, a natural language sentence structuring unit 312, a machine learning unit 313, a model input/output unit 314, an identifying unit 315, an information adding unit KS, and a transmitting unit such as transmitting/receiving unit 316. As described herein the natural language sentence structuring unit 312, machine learning unit 313, model input/output unit 314, identifying unit 315, information adding unit KS, and transmitting/receiving unit 316 are examples of obtaining units.

The data reading unit 311 reads information indicative of existing radiological reports (existing report information) and information related to the ordering, the patient attributes, and the test attributes corresponding to the existing report information. The data reading unit 311 transmits the existing radiological report information to the natural language sentence structuring unit 312 and transmits the information related to the ordering, the patient attributes, and the test attributes to the information adding unit KS.

The natural language sentence structuring unit 312 extracts necessary elements from a remark described in the natural language sentence included in an existing radiological report and structures the elements by using a RDF. The structuring of the elements of an existing radiological report is realized by the functions of the mechanical learning unit 313, the model input/output unit 314, and the identifying unit 315 and the function of the natural language sentence structuring unit 312.

For example, by giving a learning corpus or the like as teaching data to the machine learning unit 313, the machine learning unit 313 learns information as a reference of structuring.

The learning corpus includes a large amount of text data according to the format (sentence model) of the remark on the radiological report. The sentence model expresses the configuration of the remark on the radiological report like imaging parameter→region→remar→disease name. In the learning corpus, for example, the elements are tagged with the names of classification items of elements (words) constructing the sentence model of the remark included in a predetermined radiological report model (also called "report model"). Examples of the element classification items are "imaging parameter", "region", "remark", and "disease name".

In the learning corpus, the words such as "T1", "T2", and the like are tagged with the element classification item name "imaging parameter", and the words such as "cerebral ventricle", "white matter", "frontal lobe", and the like are tagged with the element classification item name "region". The words such as "high signal", "low signal", "enhancement", and "tumor mass shadowing" are tagged with the element classification item name "remark". The words such as "tumor", "ischemic change", "infarction" and the like are tagged with the element classification item name "disease name". To generate a new radiological report to be described later when such a learning corpus is given from the outside to the machine learning unit 313, in the learning corpus, representative expressions of conclusive words is similarly tagged with the element classification item name "conclusive word".

The machine learning unit 313 extracts words from the learning corpus and stores them by the classification items of corresponding elements. That is, the machine learning unit 313 uses teaching data including the learning corpus as a teaching material and learns and stores words belonging to the element classification items on the element classification item unit basis with reference to the teaching data. In this case, variations of words and expressions are normalized to some extent in the machine learning unit 313.

Further, in the machine learning unit 313, an element appearance pattern in the learning corpus is also learned and stored. For example, an appearance pattern of a word belonging to a certain classification item in a certain order such that a word belonging to the "remark" appears after the region "frontal lobe" is learned and stored.

The data learned and stored in the machine learning unit 313 is used as model data indicative of element classification items to which elements constructing an existing radiological report are classified.

The model input/output unit 314 is used to output the model data to an external computer via a communication line, a storage medium, or the like and input model data learned by an external computer via a communication line, a storage medium, or the like. Therefore, the model data learned in the information processing system 1 can be used in another information processing system. On the contrary, model data learned in another information processing system can be used in the information processing system 1.

The identifying unit 315 identifies an element classification item and a word actually used in existing radiological report information as an object which is input to the natural language sentence structuring unit 312 while using the model data learned by the machine learning unit 313 or the model data obtained by the model input/output unit 314 as a reference.

When the above-described machine learning method is used, an element classification item can be identified only for an element (word in this case) listed in the teaching data in advance. By using a machine learning method described below, an element classification item can be identified also for an element which is not listed in the teaching data in advance.

For example, the machine learning unit 313 decomposes the learning corpus to morphemes by the morphologic analysis and learns a pattern, morpheme by morpheme, in which a morpheme belonging to a certain classification item appears by using information such as the morpheme itself, the word class of the morpheme, infected forms of the morpheme, and morphemes on the front and back sides (for example, two morphemes each on the front and back sides). According to the pattern, the identifying unit 315 can recognize an element classification item also for an element (word in this case) which is not given in advance.

More concretely, for example, in the case where a sentence such as "along " (various words can enter in the "" part) frequently appears in the learning corpus, the machine learning unit 313 can learn a pattern that any of words indicative of regions is filled in the "" part when words indicative of regions frequently appear in the "" part. By using such a pattern, the identifying unit 315 can extract "pituitary" as a word indicative of a region from a phrase "along/pituitary" on the basis of the relations of words on the front and back sides from an existing radiological report. The machine learning can be realized by using a so-called SVM (Support Vector Machine). By such machine learning, the precision of the natural language process improves.

The natural language sentence structuring unit 312 structures the existing radiological report information by decomposing the existing radiological report to words (elements) belonging to the element classification items on the basis of the information identified by the identifying unit 315 and writing the words in the RDF. Since the appearance pattern of elements in the existing radiological report can be recognized, by reflecting the information of the appearance pattern into model data used in the identifying unit 315, the model data can be also developed. That is, the more the existing radiological report information is analyzed, the more the model data is developed.

The existing radiological report information structured by the natural language sentence structuring unit 312 is output to the information adding unit KS. In the information adding unit KS, the existing radiological report information is added with the attribute information of the ordering, the patient's attribute, and the test attribute sent from the data reading unit 311, thereby generating structured data described in the RDF.

Figure 4:
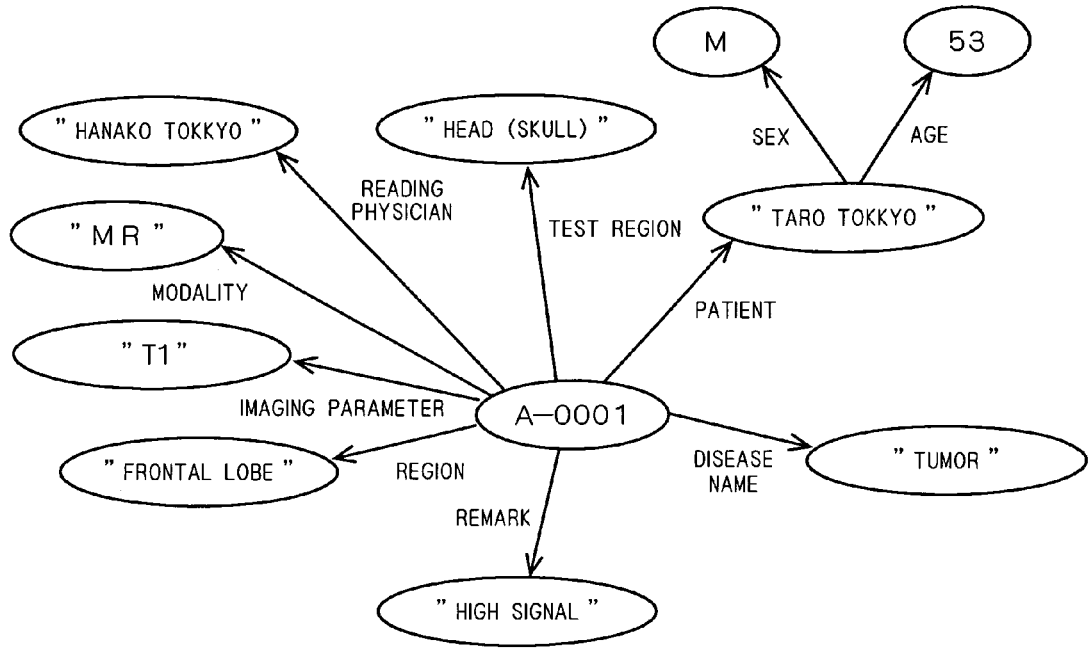
FIG. 4 is a diagram illustrating single-report element associated information described in a RDF.

FIG. 4 is a diagram showing data (hereinbelow, also called "single-report element associated information") structured so that elements constructing a single piece of existing radiological report information (including also elements constructing the attribute information related to the existing radiological report information) are associated with one another so that the elements are examples of associated elements. As shown in FIG. 4, to a file "A-0001" of existing radiological report information, the attribute values "T1", "frontal lobe", "high signal", and "tumor" of the attributes are associated using the element classification items "imaging parameter", "region", "remark", and "disease name" as the attribute items, respectively, and written in the RDF. "Head (skull)", "Taro Tokkyo", "Hanako Tokkyo", and "MR" are associated with attribute items "region", "patient name", "reading physician", and "modality" of the attribute information, respectively. Thus, for example, attribute values "T1", "frontal lobe", "high signal", and "tumor" of the attributes and "Head (skull)", "Taro Tokkyo", "Hanako Tokkyo", and "MR" as words and phrases are indirectly associated with each other through file "A-0001." Further, "M" and "53" are written so as to be associated with the attribute items "sex" and "age", respectively, as the attributes of the patient name. Thus, for example, "M" and "53" as words or phrases are directly associated with "Taro Tokkyo." The attribute items to be associated in the single-report element associated information are not limited to those shown in FIG. 4 but, for example, other attribute items included in the test attribute information may be also included.

As described above, by performing the language process on the sentence information of the remark described in the natural language sentence using the functions of the natural language sentence structuring unit 312, the machine learning unit 313, the model input/output unit 314, the identifying unit 315, and the information adding unit KS, elements (words in this case) belonging to the classification items are extracted from the sentence information and, further, associated with one another, thereby generating the single-report associated information.

The transmitting/receiving unit 316 transmits the single-report element associated information generated and obtained by the information adding unit KS to the server 100. The single-report element associated information is generated for each of a number of pieces of existing radiological report information stored in the diagnosis information DB 341 and transmitted to the server 100 by the transmitting/receiving unit 316.

Figure 5:
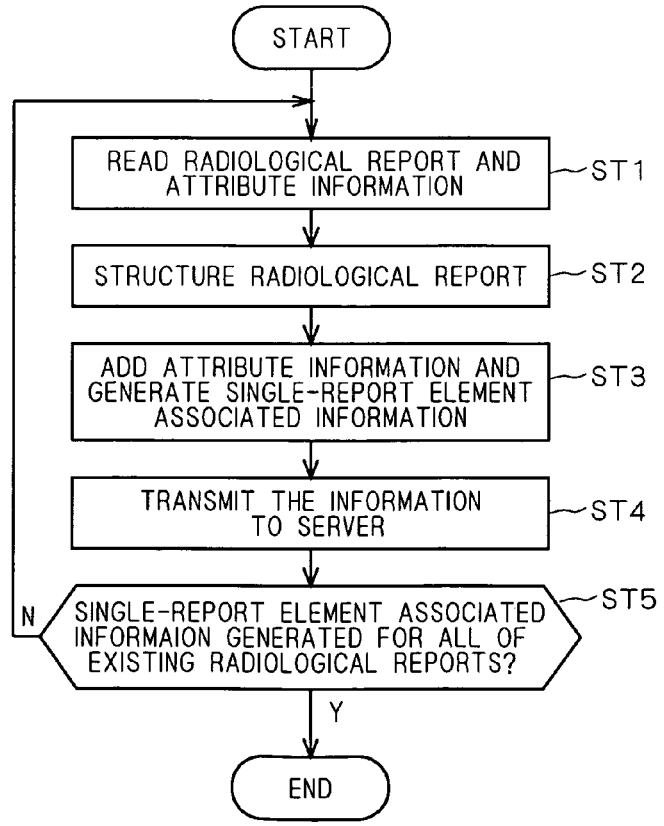
FIG. 5 is a flowchart showing an operation flow of generating single-report element associated information.

FIG. 5 is a flowchart showing the operation flow of generating single-report element associated information. The operation flow is realized by executing a predetermined program in the terminal 30.

In step ST1, the data reading unit 311 reads information indicative of a radiological report together with attribute information from the diagnosis information DB 341.

In step ST2, the radiological report read in step ST1 is structured by the functions of the natural language sentence structuring unit 312, the machine learning unit 313, the model input/output unit 314, and the identifying unit 315.

In step ST3, the attribute information is added to the radiological report structured in step ST2 by the function of the information adding unit KS, thereby generating single-report element associated information as shown in FIG. 4.

In step ST4, the single-report element associated information generated in step ST3 is transmitted to the server 100.

In step ST5, determination is made on whether or not the single-report element associated information is generated for all of the existing radiological report information stored in the diagnosis information DB 341. In the case where the single-report element associated information is not generated for all of the existing radiological report information, the program returns to step ST1, information indicative of the next radiological report or the like is read and single-report element associated information is generated. In the case where the single-report element associated information is generated for all of the existing radiological report information, the operation flow is finished.

In such a manner, in the terminals 10, 20, and 30, elements belonging to the items are extracted from sentence information by performing the predetermined information processes including the language process on the sentence information, and single-report element associated information is generated by associating the extracted elements with one another. Therefore, without accompanying complicated operations and works performed by the user, single-report element associated information obtained by associating the elements belonging to items included in a plurality of element items is easily obtained. Each of the number of elements belonging to each item extracted from sentence information and the number of elements belonging to each of the items of the single-report element associated information is not limited to one but may be one or more. Since the language process is performed on the basis of the information obtained by the machine learning as described above, the single-report element associated information obtained by associating one or more elements belonging to each of a plurality of element items among the plurality of element items is obtained properly and easily.

The radiological report information stored in the diagnosis information DB 341 increases each time a new radiological report is generated in the terminal 30. It is effective to use the radiological report information accumulated with time as past knowledge. In particular, it is more effective in the case where a new remark or the like is included in newly accumulated radiological report information for the reason that the past knowledge further evolves. Preferably, for example, each time information indicative of a new radiological report is written in the diagnosis information DB 341, the single-report element associated information is generated and transmitted to the server 100. This point will be described later in the description of the input support function.

Support Information Generating Function

Figure 6:
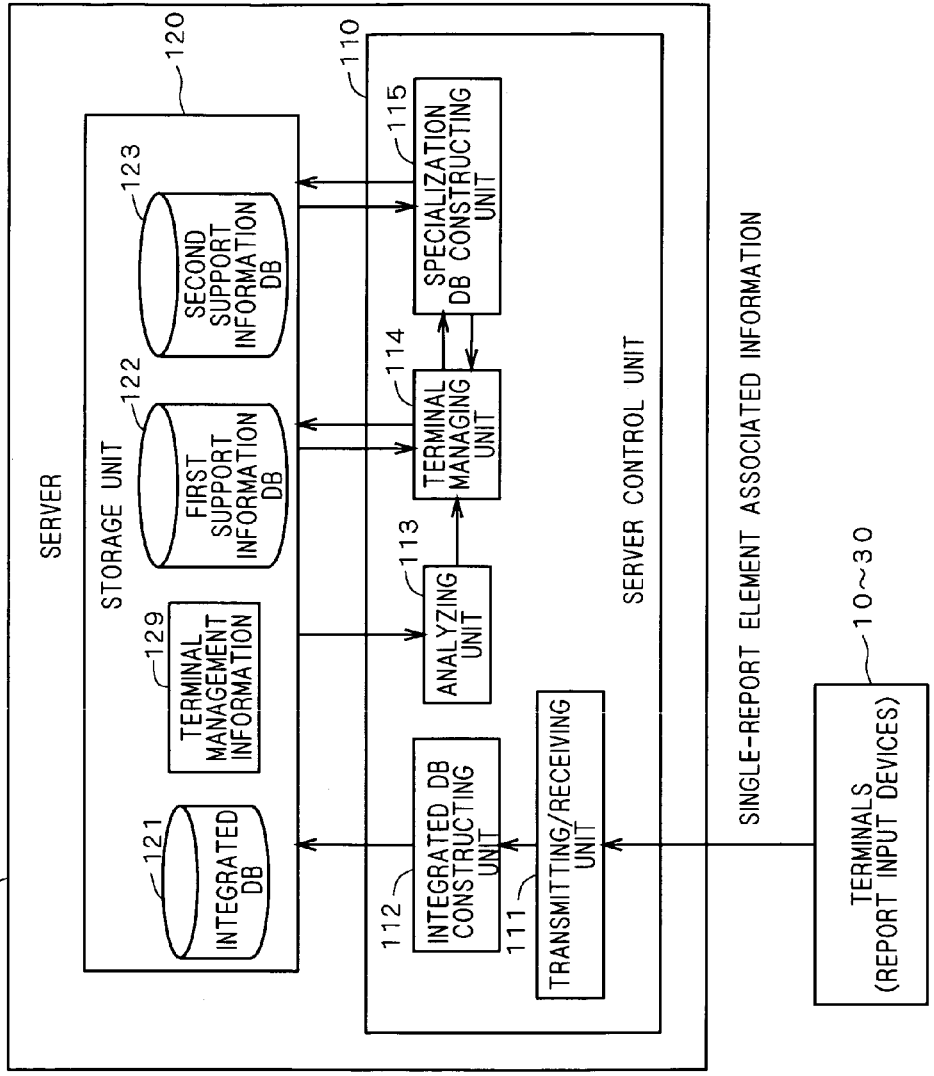
FIG. 6 is a block diagram showing a functional configuration of a support information generating function.

FIG. 6 is a block diagram showing the functional configuration of the support information generating function realized mainly by the server 100.

The server 100 has a server control unit 110 and a storage unit 120.

The server control unit 110 has a CPU, a ROM, a RAM, and the like and realizes various functions such as a support information generating function by reading and executing a program stored in the storage unit 120 by the CPU. In the server control unit 110, various data temporarily generated in various information processes is temporarily stored in a built-in RAM.

The storage unit 120 is constructed by a hard disk or the like, and stores various programs and various data.

The server 100 has, as functions, a receiving unit such as transmitting/receiving unit 111, an integrated DB constructing unit 112, a recognizing unit such as an analyzing unit 113, another recognizing unit such as a terminal managing unit 114, and a specialization DB constructing unit 115.

The transmitting/receiving unit 111 receives the single-report element associated information transmitted from the terminals 10, 20, and 30 and outputs it to the integrated DB constructing unit 112.

The integrated DB constructing unit 112 receives the single-report element associated information input from the transmitting/receiving unit 111 and stores the single-report element associated information into the storage unit 120, thereby constructing an integrated database (integrated DB) 121. The integrated DB 121 is a database in which the single-report element associated information is stored on the transmitter terminal unit basis. For example, by adding identification information such as the name, the ID, or the like of the transmitter terminal to the single-report element associated information, the single-report element associated information can be stored so as to be identified on the terminal unit basis. As a method of identifying a transmitter terminal in the integrated DB constructing unit 112, for example, there is a method of receiving the identification information such as the name, the ID, or the like of the transmitter terminal at the time of receiving the single-report element associated information, and identifying the terminal on the basis of the identification information. In the case of employing such a configuration, an entry of the identification information of the terminal is requested for the terminal 10, 20, or 30 as the transmitter. The identification information is transmitted in a state where it is associated with the single-report element associated information from the terminal 10, 20, or 30 to the server 100.

The analyzing unit 113 analyzes the single-report element associated information stored in the integrated DB 121 to thereby recognize whether or not the terminal 10, 20, or 30 as the transmitter of the single-report element associated information satisfies a specific condition. One of specific conditions is that proportion element associated information such as the proportion of single-report element associated information including predetermined element belonging to a specific attribute item in all of single-report element associated information transmitted from a terminal lies in a predetermined value range. For example, a specific condition is that the proportion of single-report element associated information including predetermined element (such as the word "tumor") related to the word "brain tumor" in words belonging to the attribute item "disease name" in all of the single-report element associated information transmitted from one terminal is 70% or higher.

The process in the analyzing unit 113 will be described more concretely. For example, with respect to the single-report element associated information stored on the terminal unit basis in the integrated DB 121, the analyzing unit 113 analyzes whether or not predetermined element related to the specific fields "brain tumor" and "cerebrovascular disease" is included in element belonging to the attribute item "disease name". The analyzing unit 113 adds information indicating that a predetermined element related to the specific field "brain tumor" is included to the single-report element associated information in which the predetermined element related to the specific field "brain tumor" is included out of a number of pieces of single-report element associated information stored in the integrated DB 121. The analyzing unit 113 adds information indicating that a predetermined element related to the specific field "cerebrovascular disease" is included to the single-report element associated information in which the predetermined element related to the specific field "cerebrovascular disease" is included. After that, the analyzing unit 113 calculates proportion element associated information such as the proportion of the single-report element associated information in which the predetermined element related to the specific fields "brain tumor" and "cerebrovascular disease" is included in the attribute item "disease name" with respect to each of the terminals with reference to the integrated DB 121, and recognizes whether or not the proportion lies in the predetermined value range, that is, whether or not the specific condition is satisfied.

In this case, a first specific condition is set that proportion of element associated information such as the proportion of the number of pieces of single-report element associated information including the predetermined element related to the specific field "brain tumor" is 70% or more of the single-report element associated information transmitted from one terminal and stored in the integrated DB 121. A second specific condition is set that proportion of element associated information such as the proportion of the single-report element associated information including the predetermined element related to the specific field "cerebrovascular disease" is 70% or more. Examples of the predetermined elements related to the specific field "brain tumor" are "tumor", "craniopharyngioma", "germinoma", and "medulloblastoma". Examples of the predetermined elements related to the specific field "cerebrovascular disease" are "brain infarction", "lacunar infarction", "acute stroke", and "anterior cerebral artery occlusion".

The analyzing unit 113 outputs information specifying terminals satisfying the first and second specific conditions on the basis of the recognition result to the terminal managing unit 114. As the information specifying a terminal, the identification information such as the name, the ID, or the like of the terminal may be used.

The terminal managing unit 114 stores, as terminal management information 129, information of terminals satisfying a specific condition associated with the specific condition on the basis of the recognition result of the analyzing unit 113 into the storage unit 120. Therefore, as the terminal management information 129, for example, information is stored in the storage unit 120, in which the first specific condition that "the proportion that words related to brain tumor are included in disease names is 70% or higher" and the identification information of terminals satisfying the first specific condition are associated with each other, and the second specific condition that "the proportion that words related to cerebrovascular disease are included in disease names is 70% or higher" and the identification information of terminals satisfying the second specific condition are associated with each other. That is, the terminals 10, 20, and 30 are classified on the basis of the analysis and the recognition result of the analyzing unit 113.

For example, in the case where the conditions (A), (B), and (C) described below are satisfied, when the two terminals 10 and 20 satisfy the first specific condition, the hospitals in which the terminals 10 and 20 are mounted are assumed as hospitals specializing in "brain tumor". When the one terminal 30 satisfies the second specific condition, the hospital in which the terminal 30 is mounted is assumed as a hospital specializing in the "cerebrovascular disease". (A) With respect to the single-report element associated information transmitted from the terminal 10, the proportion in which words related to the brain tumor are included in disease names is 80%. On the other hand, the proportion in which words related to the cerebrovascular disease are included in the disease names is 20%. (B) With respect to the single-report element associated information transmitted from the terminal 20, the proportion in which words related to the brain tumor are included in disease names is 70%. On the other hand, the proportion in which words related to the cerebrovascular disease are included in the disease names is 30%. (C) With respect to the single-report element associated information transmitted from the terminal 30, the proportion in which words related to the brain tumor are included in disease names is 30%. On the other hand, the proportion in which words related to the cerebrovascular disease are included in the disease names is 70%.

The terminal managing unit 114 outputs information related to the terminal management information 129 to a networking information generating unit such as the specialization DB constructing unit 115.

The specialization DB constructing unit 115 performs a process of reading all of the single-report element associated information sent from one or more terminals satisfying a specific condition from the integrated DB 121, arranging a plurality of elements (attribute values in this case) associated with one file in each of the single-report element associated information on the attribute item unit basis, re-associating the elements, and describing the re-associated elements in the RDF. That is, the specialization DB constructing unit 115 performs the process of arranging the plurality of associated elements in all of the single-report element associated information sent from one or more terminals satisfying the specific condition item by item, re-associating the elements, and describing the re-associated elements in the RDF. As a result of the process, information (also called "network information" hereinbelow) that one or more attribute values (that is elements which are words in this case) is/are listed for each of the plurality of attribute items, and the attribute values (that is, the elements) are associated with each other like a network between the attribute items is generated. The network information is stored in the storing unit 120, thereby becoming information for supporting input of a radiological report (input support information), and databases (hereinbelow, generically called "support information DBs", concretely, first and second support information DBs) 122 and 123 are constructed.

Concretely, for example, for all of single-report element associated information stored in the integrated DB 121 transmitted from one or more terminals satisfying the first specific condition "the proportion that words related to the brain tumor are included in disease names is 70% or higher", a process of arranging a plurality of elements associated with one file in each of the single-report element associated information by item, re-associating the elements with one another, and writing the re-associated elements in the RDF is performed. Network information generated as the result of the process is stored in the storage unit 120, thereby constructing the first support information DB 122.

On the other hand, for all of single-report element associated information transmitted from one or more terminals satisfying the second specific condition "the proportion that words related to the cerebrovascular disease are included in disease names is 70% or higher" and stored in the integrated DB 121, a process of arranging a plurality of elements associated with one file in each of the single-report element associated information by item, re-associating the elements with one another, and writing the re-associated elements in the RDF is performed. Network information generated as the result of the process is stored in the storage unit 120, thereby constructing the second support information DB 123.

More concretely, for example, in the case where the situations (A), (B), and (C) are satisfied, the first support information DB 122 is constructed on the basis of the single-report element associated information transmitted from the two terminals 10 and 20, and the second support information DB 123 is constructed on the basis of the single-report element associated information transmitted from one terminal 30.

As described above, when the first and second support information DBs 122 and 123 are constructed on the basis of the trend of the single-report element associated information which varies among terminals, the signal-report element associated information is classified according to the specialties of the hospitals, and different support information DBs are constructed. More specifically, the first support information DB 122 for hospitals specializing in "brain tumor" and the second support information DB 123 for hospitals specializing in "cerebrovascular disease" are constructed.

The data structure of the support information DB and the data constructing method will be described.

Figure 7:
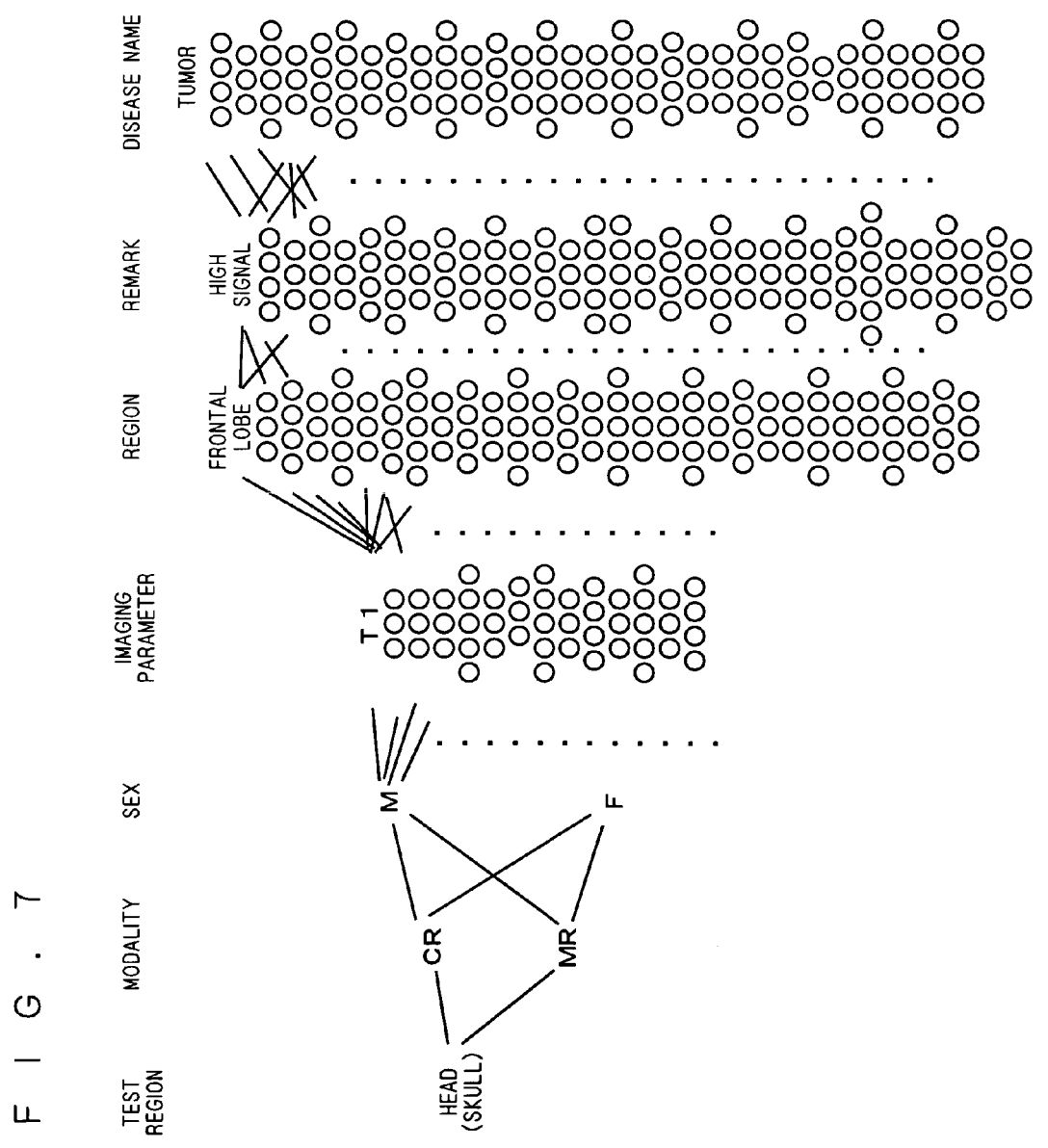

FIG. 7 is a diagram showing an example of the data configuration of a support information DB obtained by structuring elements constructing single-report element associated information transmitted from one or more terminals satisfying a specific condition, that is, an example of structuring elements of a number of pieces of existing radiological report information. FIG. 7 shows network information of the region classification "head (skull)".

In FIG. 7, the associated words are connected by lines. To avoid complication of the diagram, the words are properly expressed as "OOO" and the like. The lines indicative of association existing in a relatively upper part of the diagram are shown, and the other lines are not given.

In the specialization DB constructing unit 115, at the time of generating network information, the number of combining words among items associated in the single report element associated information is counted. The count information is stored in the support information DBs 122 and 123. For example, the number of combinations of words such as "head-MR-M-T1-frontal lobe-high signal-tumor" is stored as the count information. The network information and the count information is information indicative of the association of one or more words belonging to the items and will be properly generically called "associated element network information".

In the network information stored in the first and second support information DBs 122 and 123, what kinds of word are written respectively in existing radiological reports is shown in association with a plurality of words between attribute items. Consequently, it is effective to visibly output the network information and use it at the time of inputting a new radiological report. It is particularly effective to set the attribute items as input element items, set a plurality of words listed in the attribute items as input candidates (options), and provide them in the form of a template.

However, in the network information stored in the first and second support information DBs 122 and 123, when the number of synonyms (for example, "T2 weighted image" and "T2W1") of words listed in attribute items is large, the number of options is too large, and it is difficult to designate an option. Consequently, at the time of detecting words, a process of replacing the synonyms with a representative one word is performed in the identifying unit 105. When there is a "conclusive word" or the like as the attribute item, if variations of expressions of the conclusive words are too many (for example, "kangaeru (I think)" and "kangaemasu (I will think)"), the options increase are too many, and it is difficult to designate an option. Consequently, a process of replacing the variations of expressions with a representative expression at the time of detecting a conclusive word is also performed in the identifying unit 315.

Such replacement of words with a representative word can be realized by including a data table storing the correspondence between a plurality of words and a representative word into teaching data. Variations of expressions may be normalized and replaced with an expression of the highest use frequency. The synonyms may be also replaced with a synonym of the highest use frequency.

Figure 8:
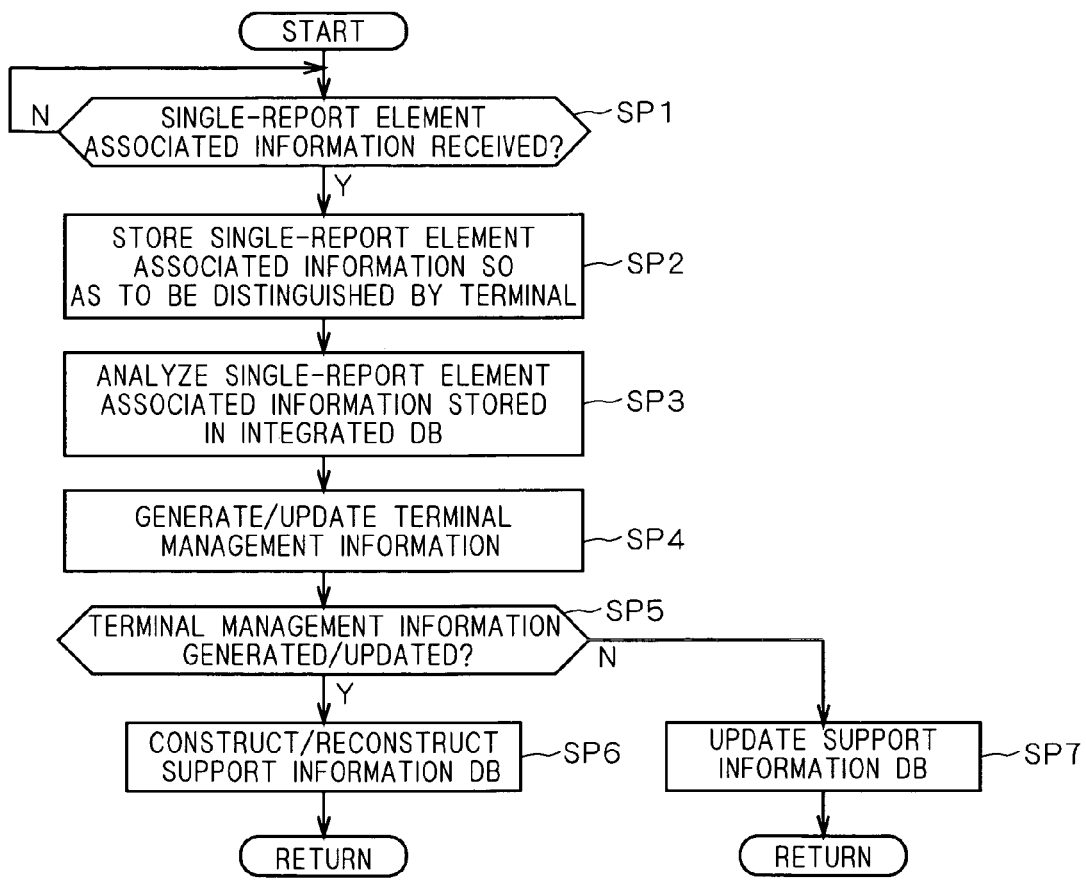
FIG. 8 is a flowchart showing an operation flow of generating support information.

FIG. 8 is a flowchart showing the operation flow of an operation of generating the first and second support information DBs 122 and 123 in the support information generating function. The operation flow is realized when a program for realizing the support information generating function is executed in the server control unit 110.

In step SP1, determination is made on whether or not the transmitting/receiving unit 111 has received single-report element associated information. Until the transmitting/receiving unit 111 receives the single-report element associated information, the determination in step SP1 is repeated. When the single-report element associated information is received, the program advances to step SP2.

In step SP2, the integrated DB constructing unit 112 constructs the integrated DB 121 by storing the single-report element associated information received by the transmitting/receiving unit 111 on the terminal unit basis into the storage unit 120.

In step SP3, the analyzing unit 113 analyzes the single-report element associated information stored in the storage unit 120 in step SP2 to recognize whether or not each of the terminals satisfies a specific condition (concretely, the first or second specific condition). First, whether or not the single-report element associated information includes a predetermined element with respect to a specific item is analyzed. Information indicating that the predetermined element is included as an element belonging to the specific item is properly added to single-report element associated information constructing the integrated DB 121. By referring to the integrated DB 121, whether or not each of the terminals satisfies a specific condition is recognized.

In step SP4, the terminal managing unit 114 generates the information (terminal management information) 129 indicating whether or not each of the terminals satisfies the specific condition on the basis of the analysis and recognition result in step SP3. When the process in step SP4 is the second time or later, the terminal management information 129 is updated.

In step SP5, determination is made on whether or not the terminal management information 129 is generated or updated by the terminal managing unit 114. When the terminal management information 129 is generated or updated, the program advances to step SP6. When the terminal management information 129 is not generated or updated, the program advances to step SP7.

In step SP6, the terminal management information 129 is read by the terminal managing unit 114, and element associated network information is generated on the basis of all of single-report element associated information transmitted from one or more terminals satisfying a specific condition by the specialization DB constructing unit 115. By storing the element associated network information in the storage unit 120, the support information DBs (concretely, the first and second support information DBs 122 and 123) are constructed. When the process in step SP6 is performed for the second time or later, the support information DB is reconstructed. After completion of the process in step SP6, the program returns to step SP1.

In step SP7, the support information DB is updated by the specialization DB constructing unit 115 on the basis of the single-report element associated information and the terminal management information 129 newly stored in the storage unit 120 in step SP2. After that, the program returns to step SP1.

Since a new radiological report is generated as needed in the terminals 10, 20, and 30, the transmitting/receiving unit 111 in the server control unit 110 receives new single-report element associated information from the terminals 10, 20, and 30. At this time, information stored in the integrated DB 121 is updated by the integrated DB constructing unit 112. Consequently, each time new single-report element associated information is added, information related to the single-report element associated information has to be reflected in the support information DB. In step SP7, information related to new single-report element associated information is added to the support information DB.

Information Distributing Function

Figure 9:
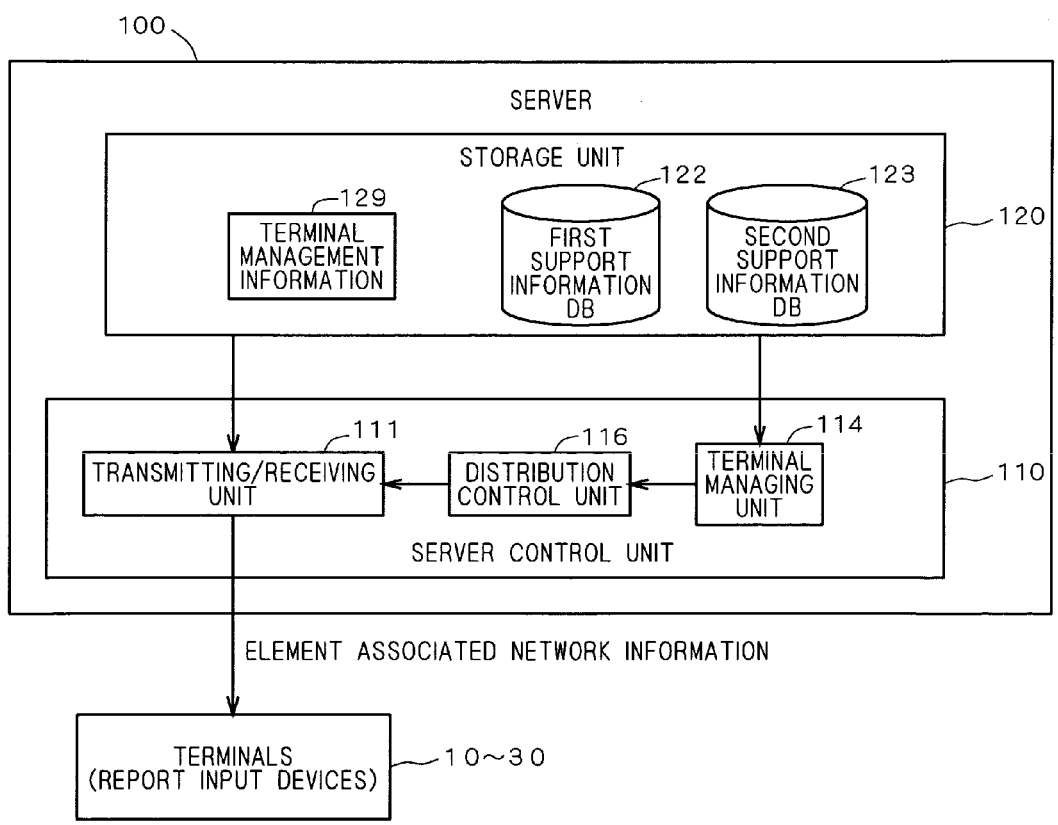
FIG. 9 is a block diagram showing a functional configuration of an information distributing function.

FIG. 9 is a block diagram showing the functional configuration of the information distributing function mainly realized by the server 100. When the CPU reads and executes a program stored in the storage unit 120, the server 100 realizes various functional configurations related to the information distributing function.

The server 100 has, as the functional configuration of the information distributing function, a distributing unit such as the transmitting/receiving unit 111, the terminal managing unit 114, and a distribution control unit 116.

The terminal managing unit 114 reads the terminal management information 129 stored in the storage unit 120 and outputs it to the distribution control unit 116.

The distribution control unit 116 recognizes a terminal satisfying a specific condition on the basis of the terminal management information 129 input from the terminal managing unit 114 and outputs a command of transmitting information constructing a support information DB related to the specific condition (concretely, element associated network information) to the recognized terminal to the transmitting/receiving unit 111. For example, by the distribution control unit 116, information constructing the first support information DB 122 (concretely, element associated network information) is transmitted to the terminals 10 and 20 satisfying the first specific condition, and information constructing the second support information DB 123 (concretely, element associated network information) is output to the terminal 30 satisfying the second specific condition.

The transmitting/receiving unit 111 reads the support information DB, that is, element associated network information corresponding to the specific condition from the storage unit 120 in accordance with the command from the distribution control unit 116 and transmits (distributes) it to a terminal satisfying the specific condition. For example, by the transmitting/receiving unit 111, the information constructing the first support information DB 122 (concretely, element associated network information) is transmitted to the terminals 10 and 20 satisfying the first specific condition, and the information constructing the second support information DB 123 (concretely, the element associated network information) is transmitted to the terminal 30 satisfying the second specific condition.

Figure 10:
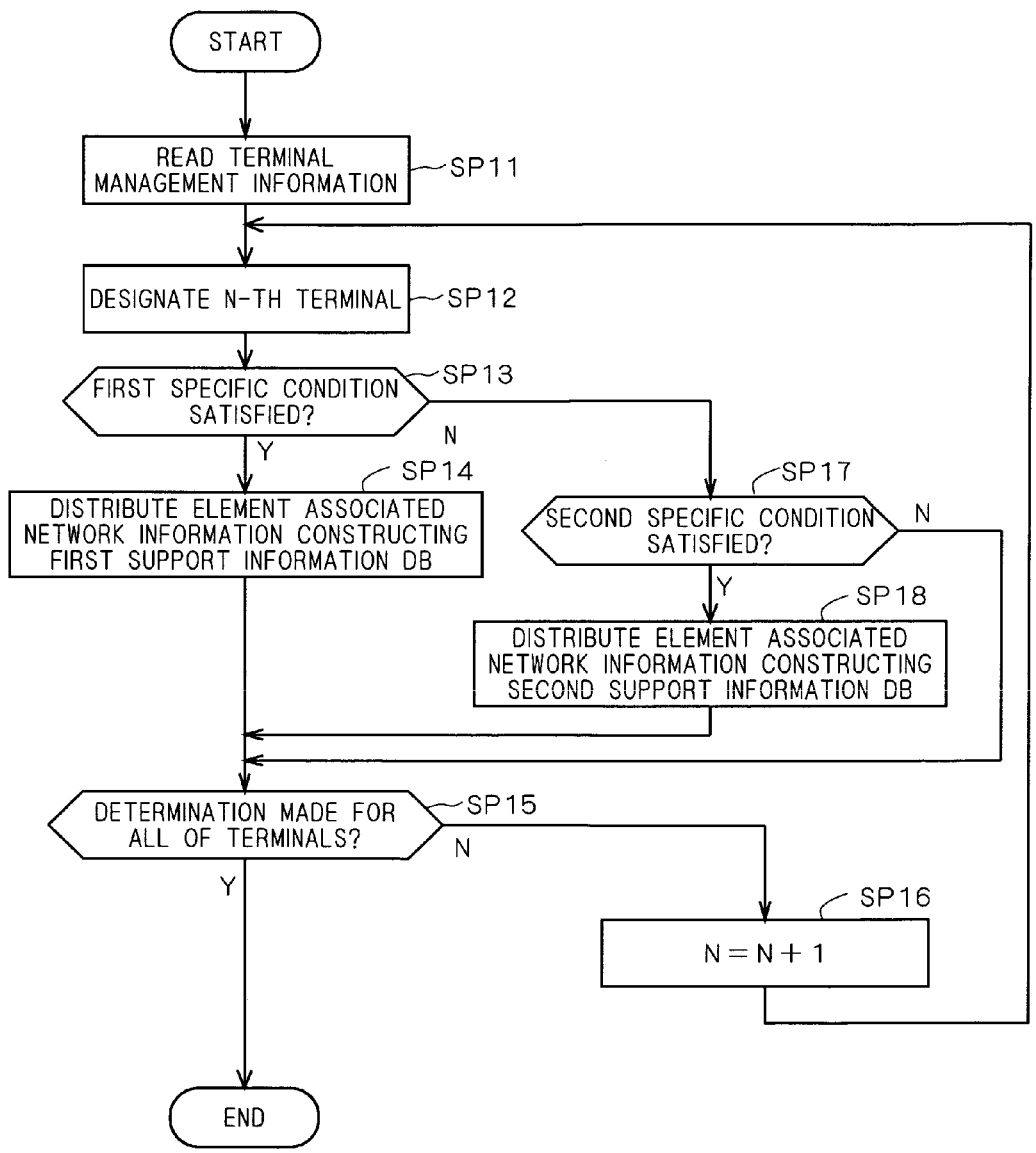
FIG. 10 is a flowchart showing an operation flow related to the information distributing function.

FIG. 10 is a flowchart showing the operation flow in the information distributing function. The operation flow is realized when a program for realizing the information distributing function is executed in the server control unit 110. Examples of the timing of executing the operation flow are the timing when the terminal management information 129 is updated or the timing when the support information DB is updated.

In step SP11, by the terminal managing unit 114, the terminal management information 129 is read from the storage unit 120 and output to the distribution control unit 116.

In step SP12, the N-th terminal is designated as a determination object by the distribution control unit 116. When the process in step SP12 is performed for the first time, count information N for designating a determination object is set as 1 and, for example, the terminal 10 is designated as an object to be determined. When the process in step SP12 is performed for the n-th time, N=n. For example, when n=2, the terminal 20 is designated as a determination object. When n=3, the terminal 30 is designated as a determination object.

In step SP13, the distribution control unit 116 determines whether or not the terminal designated as the determination object satisfies the first specific condition on the basis of the terminal management information 129. In the case where it is determined that the terminal satisfies the first specific condition, the program advances to step SP14. In the case where it is determined that the terminal does not satisfy the first specific condition, the program advances to step SP17.

In step SP14, under control of the distribution control unit 116, the transmitting/receiving unit 111 transmits the element associated network information constructing the first support information DB 122 to the terminal designated as the determination object.

In step SP15, the distribution control unit 116 determines whether or not all of terminals managed by the terminal management information 129 have been designated as determination objects. When all of the terminals have not been designated as determination objects, the program advances to step SP16. When all of the terminals have been designated as determination objects, the operation flow is finished.

In step SP16, the count information N for designating a terminal to be determined is incremented only by one. The program returns to step SP12 where the next terminal is designated as the determination object, and the processes in step SP13 and the following steps are performed.

On the other hand, in the case where the program advances from step SP13 to step SP17, in step SP17, the distribution control unit 116 determines whether or not the terminal designated as the determination object satisfies the second specific condition. When it is determined that the terminal satisfies the second specific condition, the program advances to step SP18. When it is determined that the terminal does not satisfy the second specific condition, the program advances to step SP15.

In step SP18, under control of the distribution control unit 116, the transmitting/receiving unit 111 transmits the element associated network information constructing the second support information DB 123 to the terminal designated as the determination object. The program advances to step SP15.

By properly repeating the processes in steps SP11 to SP18 as described above, the element associated network information constructing the first and second support information DBs 122 and 123 is properly transmitted to the terminals satisfying the first and second specific conditions, respectively.

In this case, the element associated network information constructing the first and second support information DBs 122 and 123 is properly transmitted on the basis of the trend of the signal-report element associated information which varies among terminals, so that the element associated network information according to the specialty of a hospital is transmitted. More specifically, for example, element associated network information constructing the first support information DB 122 for a hospital specializing in "brain tumor" is transmitted to a hospital specializing in "brain tumor". Element associated network information constructing the second support information DB 123 for a hospital specializing in "cerebrovascular disease" is transmitted to a hospital specializing in "cerebrovascular disease".

Input Supporting Function

Figure 11:
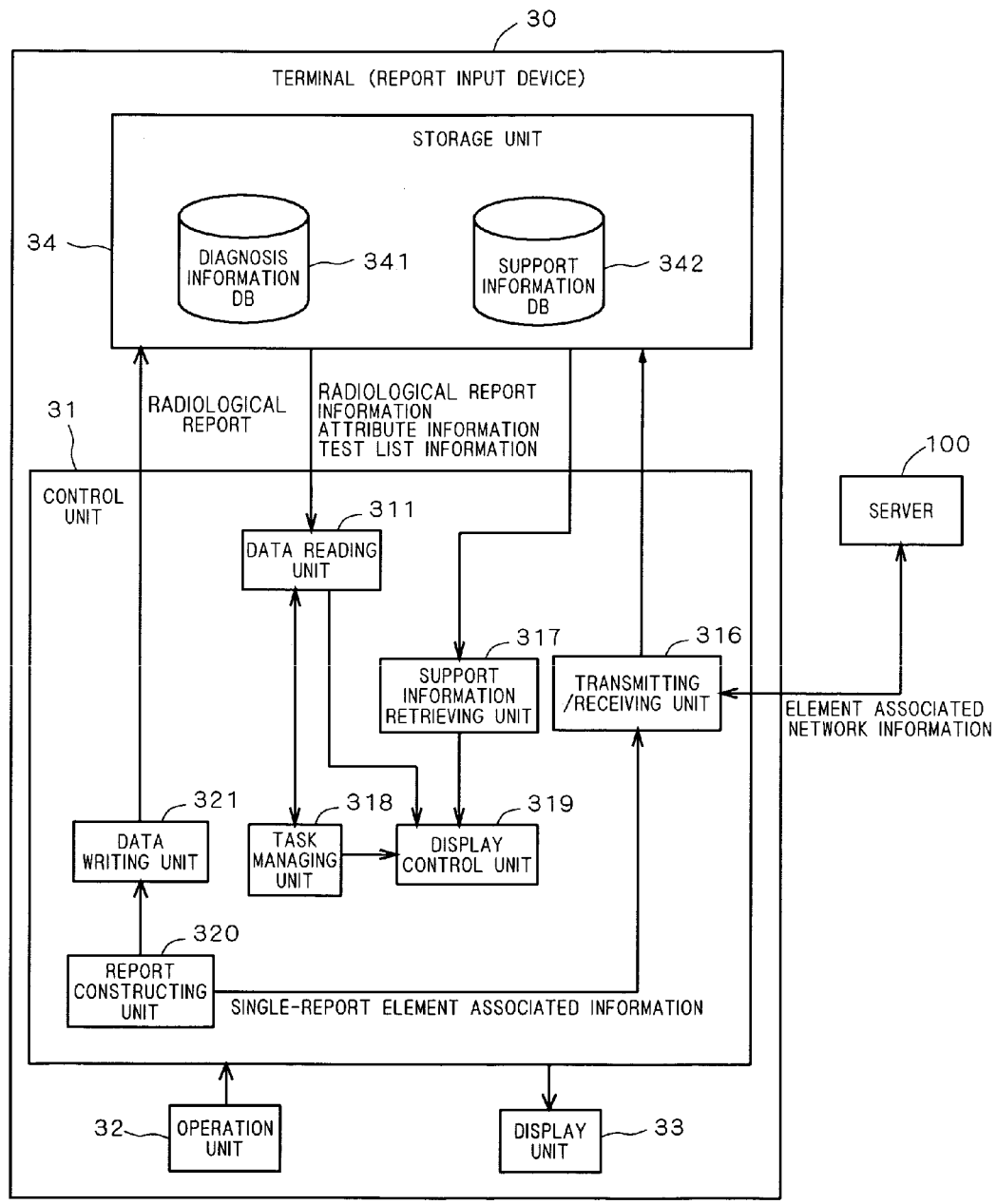
FIG. 11 is a block diagram showing a functional configuration related to an input supporting function.

FIG. 11 is a block diagram showing the functional configuration of the input supporting function mainly realized by the terminal 30. When the CPU reads and executes a program stored in the storage unit 34, the terminal 30 realizes various functional configurations related to the information supporting function.

The terminal 30 has, as the functional configuration of the input supporting function, the data reading unit 311, the transmitting/receiving unit 316, a support information retrieving unit 317, a task managing unit 318, the display control unit 319, a report constructing unit 320, and a data writing unit 321. The element associated network information transmitted from the server 100 is stored in the storage unit 34 by the information distributing function, thereby constructing a support information DB 342.

By the functional configuration shown in FIG. 11, an operation of specifying a test as an input object of a radiological report (test specifying operation) and an operation of actually supporting input of a radiological report (input supporting operation) are realized. In the following, the test specifying operation and the input supporting operation will be described in order with reference to FIG. 11.

Test Specifying Operation

The data reading unit 311 reads information of a test list (test list information) from the diagnosis information DB 341 and transfers it to the task managing unit 318.

The task managing unit 318 specifies and manages a test as an input object of a radiological report. The task managing unit 318 provides the test list information from the data reading unit 311 to the display control unit 319 and, in response to an input from the operation unit 32, specifies a task related to generation of a new radiological report.

The display control unit 319 visibly outputs the test list information on a radiological report input screen in the display unit 33.

Concretely, a radiological report input screen G1 as shown in FIG. 12 is displayed in the display unit 33. In a test list display area A2, for example, a test list as shown in FIG. 13 is displayed. In the test list, the names of patients are listed in order from top, and sex, test ID, and a state showing whether or not a radiological report is generated are written for each of the names of the patients. As shown in FIG. 12, the radiological report input screen G1 is constructed mainly by an area (order display area) A1 for displaying an order (ordering information), an area (test list display area) A2 for displaying a test list, an area (test information display area) A3 for displaying test information, an area (report generation area) A4 for inputting and generating a radiological report, an area (remark display area) A5 for displaying a remark, an area (memo area) A6 for writing a memo, an area (image attachment area) A7 to which a representative image is attached, and an area (command input area) A8 in which icons for inputting commands are listed.

A test related to a new radiological report generating operation is specified by the following operation.

First, when the operation unit 32 is properly operated in a state where a test list is displayed in the test list display area A2 in the display unit 33, a desired patient is designated from the test list. The task managing unit 318 receives information indicative of the designated patient's name in response to the input designating the patient from the operation unit 32, and specifies a task related to generation of a new radiological report, which corresponds to the information indicative of the designated patient name received.

The data reading unit 311 reads attribute information of ordering, patient attributes, and the test attributes corresponding to the patient's name designated from the diagnosis information DB 341 under control of the task managing unit 318 and outputs it to the display control unit 319. On the basis of the information related to ordering, patient attributes, and test attributes, in the radiological report input screen G1, the display control unit 319 visibly outputs the ordering information as shown in FIG. 14 to the order display area A1 and visibly outputs the attribute information related to the patient attributes and the test attributes as shown in FIG. 15 to the test information display area A3.

Input Supporting Operation

In the input supporting operation, network information generated by the support information generating function is visibly output in the form of template display in the report generation area A4. By properly designating an option of words in the template display, a new radiological report is input.

However, if the entire network information is simply displayed in the form of template display using, as options, a plurality of words listed in attribute items as shown in FIG. 7, the number of options listed is too large to select an option.

Figure 16:
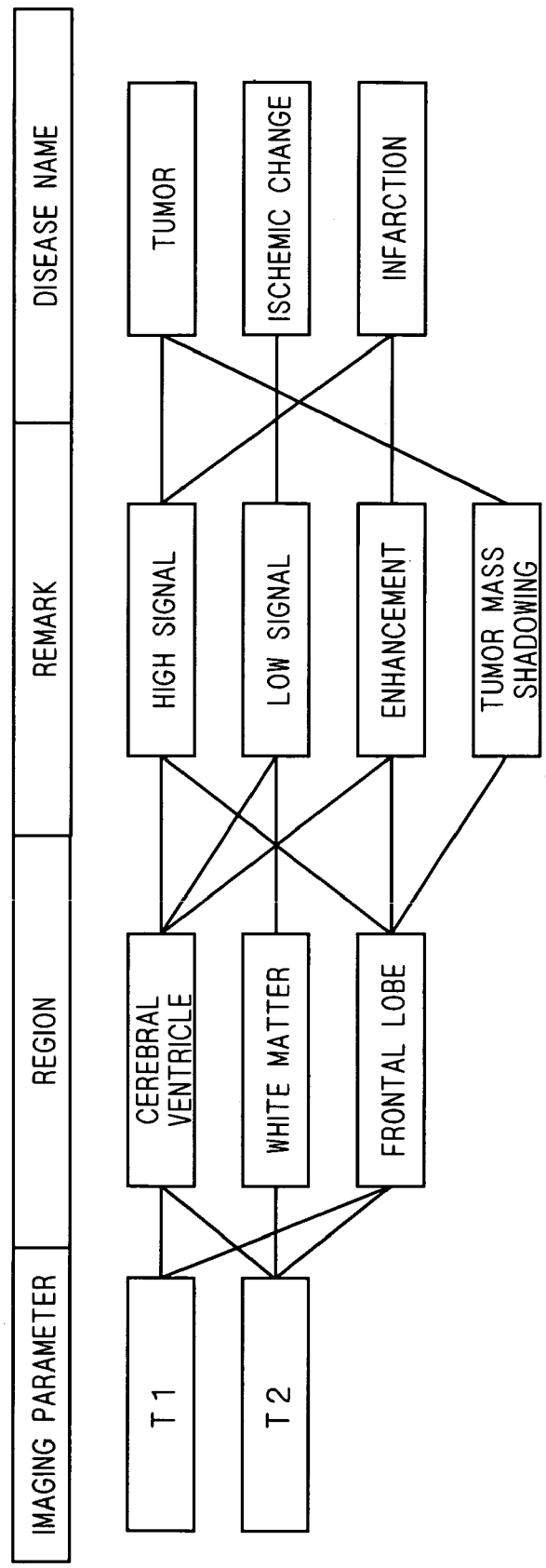
FIG. 16 is a diagram showing a visible output of partial network information.

For example, when it is assumed that the entire network information is narrowed to information of "male, head, MR", partial network information as shown in FIG. 16 can be extracted. In the partial network information shown in FIG. 16, a plurality of options (that is, elements) belonging to input element items "imaging parameter", "region", "remark", and "disease name" are associated with each other between the input element items in a network state. The phrase "input element item" is used as the meaning of an element item for inputting one or more elements corresponding to an item of an element constructing a radiological report. Although a plurality of elements belong to each of the input element items in FIG. 16, the number of elements belonging to each of the input element items may be one or more.

In the template display showing a view of the partial network information as shown in FIG. 16, the number of options listed is limited to some extent. Consequently, the options are easily viewed, and it is easy to select an option. The input element items listed cover items necessary to input a remark of a radiological report. Even when the network information in the template display is narrowed, entry of the remark is just facilitated without causing any inconvenience.

A method of extracting the partial network information from the entire network information will be described.

FIG. 17 is a diagram showing a template display (extraction condition determination template display) TP1 for determining an extraction condition for extracting desired partial network information from the entire network information.

As described above, when a test is specified in the test specifying operation, in the radiological report input screen G1 (FIG. 12), for example, the ordering information (FIG. 14) is displayed in the order display area A1, and the attribute information (FIG. 15) of a patient and a test is displayed in the test information display area A3. By the function of the support information retrieving unit 317, the extraction condition determination template display TP1 is displayed in the report generation area A4.

As shown in FIG. 17, in the extraction condition determination template display TP1, by selecting one word (option) with respect to each of the attribute items "region classification", "modality", and "sex" as part of all of the attribute items in the entire network information, combination of options can be designated as extraction conditions. The extraction conditions are supplied to the support information retrieving unit 317 in response to an input from the operation unit 32.

Concretely, in the extraction condition determination template display TP1 shown in FIG. 17, one attribute value (option) can be selected from each of lists PL1 to PL3 with a mouse pointer MP that operates in response to an operation of a mouse of the operation unit 32. By selecting one option from each of the attribute items, placing the mouse pointer MP on a condition determination button BT, and clicking the left button of the mouse, a combination of options (words) in the three attribute items can be determined.

The support information retrieving unit 317 searches the support information DB 342 in response to designation of the extraction condition from the operation unit 32. The support information retrieving unit 317 extracts partial network information corresponding to the extraction conditions from the entire network information as information for displaying the information as the template display in the report generation area A4. The support information retrieving unit 317 can extract the partial network information satisfying the extraction condition from the entire network information by referring to the count information stored in the support information DB 342. At this time, the support information retrieving unit 317 also extracts the partial count information corresponding to the extracted partial network information from the count information. The partial network information and the partial count information are also generically called "partial element associated network information".

Figure 18:
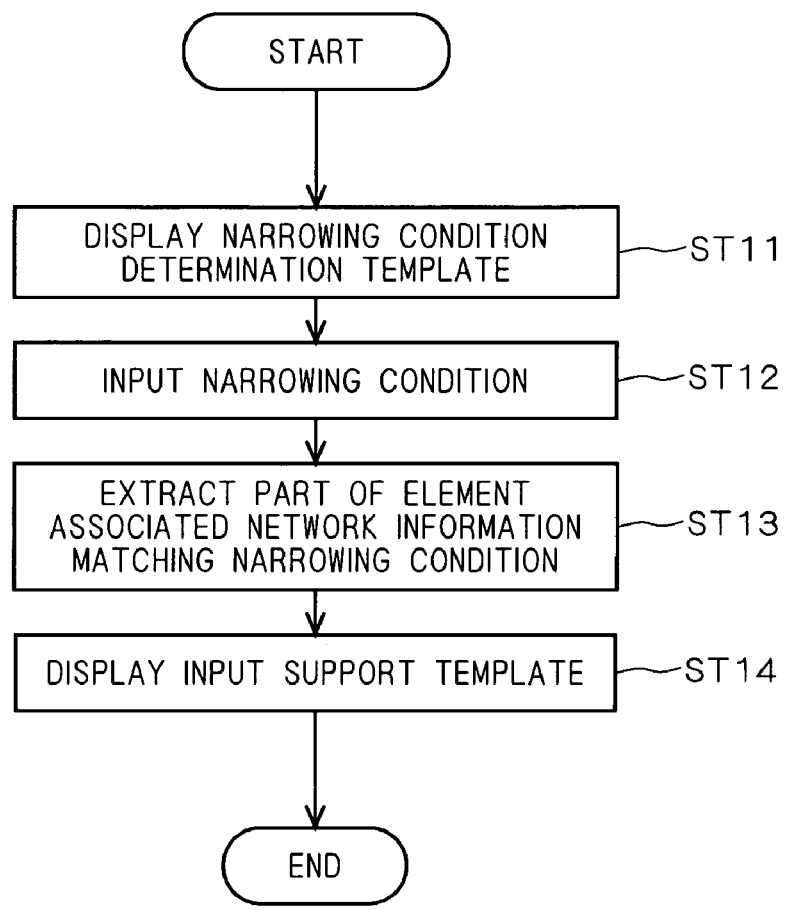
FIG. 18 is a flowchart showing an operation flow of narrowing information to be displayed.

FIG. 18 is a flowchart showing the operation flow of narrowing information to be displayed. The operation flow is realized when a program for realizing the input support operation is executed in the terminal 30.

In step ST11, by the control of the display control unit 319, the extraction condition determination template display TP1 as shown in FIG. 17 is displayed in the report generation area A4 in the display unit 33.

In step ST12, an extraction condition is input in response to designation of options on the extraction condition determination template display TP1. For example, a reading physician can specify the region classification "head", the modality "MRI", and the sex "male" by referring to the ordering information (FIG. 14) displayed on the radiological report input screen G1. With respect to the three items "region classification", "modality", and "sex", the combination of the region classification "head", the modality "MRI", and the sex "M" can be input as the extraction, conditions.

In step ST13, the support information retrieving unit 317 extracts the partial network information matching the extraction conditions input in step ST12 from the support information DB 342. The support information retrieving unit 317 outputs the partial network information to the display control unit 319.

In step ST14, by the control of the display control unit 319, the template display in which the partial network information extracted in step ST13 is visibly displayed is provided in the report generation area A4. Since the template display provided here is used to support input of a remark of a new radiological report, it will be also called "input support template display" hereinbelow.

FIG. 19 is a diagram showing a display example of an input support template display TP2. Various inputs and designations in the input support template display TP2 which will be described later are performed on the basis of a signal input in response to an operation on the operation unit 32 by the reading physician.

As shown in FIG. 19, in an area of about ¾ from the top of the input support template display TP2, a plurality of words F1 to F4 of the items "imaging parameter", "region", "remark", and "disease name" are displayed in order from the left. Concretely, a plurality of words ("T1" and "T2") F1 are listed in the attribute item "imaging parameter". A plurality of words ("cerebral ventricle", "white matter", and "frontal lobe") F2 are listed in the attribute item "region". A plurality of words ("high signal", "low signal", enhancement", and "tumor mass shadowing") F3 are listed in the attribute item "remark". A plurality of words (tumor", "ischemic change", and "infarction") F4 are listed in the attribute item "disease name".

With respect to the four items "imaging parameter", "region", "remark", and "disease name", words associated with each other between the items are displayed in a state where they are connected by lines (solid lines) on the basis of the partial network information extracted under the extraction conditions. The partial network information narrowed to some extent is visibly displayed as a view. Therefore, the user can refer to the view by which the past knowledge is known at a glance.

By placing the mouse pointer MP on one of the plurality of words and clicking the left button of the mouse with respect to each of the four items "imaging parameter", "region", "remark", and "disease name", words corresponding to the items constructing a remark on a new radiological report can be designated.

At the time of designating the words corresponding to the items, a reading physician as the user refers to a sentence model MD of the remark on the radiological report displayed in a lower part of the input support template display TP2. The sentence model MD is displayed on the basis of the data of a report model (in this example, the sentence model) given from the outside together with teaching data or the like.

The sentence model MD is a model of a remark on a radiological report such that "in [blank W1] image, in [blank W2], [blank W3] is recognized, and [blank W4] is suspected". In the blanks W1, W2, W3, and W4, words as elements (elements constructing a report, hereinbelow, also called "report constructing elements") of the four items "imaging parameter", "region", "remark", and "disease name" are filled, respectively. Specifically, by designation of words of a reading physician, one word (for example, "T1") in the plurality of words (options) F1 is filled in the blank W1. One word (for example, "frontal lobe") from the plurality of words (options) F2 is filled in the blank W2. One word (for example, "high signal") from the plurality of words (options) F3 is filled in the blank W3. One word (for example, "infarction") in the plurality of words (options) F4 is filled in the blank W4.

At the time of designating words for the four items, a configuration may be employed such that when the mouse pointer MP is placed on a word (designated word) belonging to any one of the four items, the support information retrieving unit 317 refers to partial count information corresponding to partial network information. When the number of combinations of options including the designated word is equal to or larger than a predetermined number (for example, ten times), lines indicating the combination of the options including the designated word are emphasized as thick lines. Although the conclusive words are fixed in the sentence model MD shown in FIG. 19, the invention is not limited to the example. For example, one of a plurality of words (for example, "recognized" and "not recognized") may be selected as a conclusive word. The other words constructing a natural sentence such as adjectives and adverbs may be selectively designated.

When an element designating unit such as the operation unit 32 is properly operated and the command "remark registration" in the command input area A8 is designated in a state where the words designated for the four items are filled in the blanks W1 to W4 of the sentence model MD, the words filled in the blanks W1 to W4 in the sentence model MD are designated as report constructing elements in accordance with the predetermined sentence model MD. By an element designating unit such as the report constructing unit 320, a new remark is generated and registered on the basis of the sentence model MD and the designated report constructing element. The remark is thus displayed in the remark display area A5. The information of the remark newly generated is additionally registered in the diagnosis information DB 341 by the data writing unit 321. That is, information of a new radiological report (new radiological report information) including the new remark in accordance with the predetermined sentence model MD included in the predetermined report model is generated. Although one report constructing element is designated for each of the items in the example, the invention is not limited to the designation. At least one report constructing element may be designated. For example, two or more report constructing elements may be designated for each item.

When the user operates the operation unit 32 in a state where the view of the partial network information are visibly displayed in the terminals 10, 20, and 30 to designate at least one element as a report constructing element for each of the items included in the view, new radiological report information in accordance with the predetermined report model is generated. Thus, a radiological report adapted to situations such as the specialties of hospitals can be generated easily and properly.

The report constructing unit 320 generates new single-report element associated information by associating the elements filled in the blanks W1 to W4 in the sentence model MD, the elements (words in this case) constructing the extracting condition, and the elements constructing the patient attributes and the test attributes related to the radiological report to be input with a file name of the radiological report. The new single-report element associated information is output to the server 100 via the transmitting/receiving unit 316. In the server 100, by the support information generating function, the integrated DB 121, the terminal management information 129, and the first and second support information DBs 122 and 123 are properly updated.

Although the single-report element associated information is generated on the basis of the elements and the like designated in the input support template TP2, the single-report element associated information may be generated by the associated information generating function by using a remark or the like as a natural sentence newly input to the diagnosis information DB 341. However, it is preferable to directly generate the single-report element associated information on the basis of the designated elements and the like for the reason that the computation amount is smaller.

As described above, in the information processing system 1 of the embodiment of the present invention, in the case where the single-report element associated information in which the elements belonging to the items included in the plurality of element items are associated by the support information generating function in the server 100 is transmitted from the terminal 10, 20, or 30 satisfying the specific condition, network information obtained by associating one or more elements belonging to each of the items between the plurality of element items is generated on the basis of the single-report element associated information. By employing such a configuration, network information adapted to use states of the terminals 10, 20, and 30 such as the specialties of hospitals in which the terminals 10, 20, and 30 are mounted is generated. Therefore, information in which various elements are associated with one another can be generated and provided according to the situations.

In particular, the server 100 recognizes that the terminals satisfy the specific conditions on the basis of the single-report element associated information sent from the terminals 10, 20, and 30 by the support information generating function. Consequently, the situations can be discriminated more properly and easily according to the use states of the terminals. As a result, network information adapted to the situations more properly is generated. More specifically, in the server 100, when the proportion of the single-report element associated information including a predetermined element in the plurality of single-report element associated information transmitted from one terminal to the server 100 lies in a predetermined value range, it is recognized that the terminal satisfies the specific condition. Consequently, a situation according to the use state of the terminal can be discriminated from the viewpoint of the type of the information.

The server 100 transmits the element associated network information for constructing the support information DB related to a specific condition to a terminal satisfying the specific condition in the plurality of terminals 10, 20, and 30 by the information transmitting function. Therefore, element associated network information generated according to a specific use state of the terminal such as the specialty of a hospital is transmitted to a terminal in the specific use state. The user can easily obtain information adapted to the situations via the terminal.

In the terminals 10, 20, and 30, a view of partial network information according to the specialty of a hospital is visibly output by the input support function. Consequently, in the terminals 10, 20, and 30, the user can easily obtain information adapted to the situations. Although partial network information adapted to the extraction condition is extracted from the entire network information and a view of the partial network information is visibly output in this case, the invention is not limited to the case. For example, when the number of elements constructing the entire network information is small, the view of the entire network information may be visibly output in the terminals 10, 20, and 30.

Effects obtained by the information processing system 1 of the embodiment of the present invention will be described more specifically by mentioning concrete examples.

If there are a "hospital specializing in brain tumor" and a "hospital specializing in cerebrovascular disease", radiological reports generated in the two types of hospitals are largely different from each other. For example, for the "hospital specializing in brain tumor", the information of the support information DB generated on the basis of the radiological report generated by the "hospital specializing in cerebrovascular disease" is information which is hardly used. Therefore, when a support information DB is generated by mixing the radiological reports generated by the two types of hospitals, the support information DB including a large amount of information which is hardly used for both of the hospitals is resulted. As a method of generating the support information DB for the "hospital specializing in brain tumor", only radiological reports related to brain tumors are extracted from the information of collected radiological reports, and the support information DB is generated. However, even in the "hospital specializing in brain tumor", although the other cases are not written in detail, radiological reports on the other cases are also written.

To address such a problem, the information processing system 1 of the embodiment of the present invention provides the support information DB using not only the radiological reports related to the specialty but also radiological reports related to the other specialties while classifying radiological reports according to the specialties. Therefore, also in the case of generating a radiological report which is not related to the specialized field of the hospital, generation of a simple radiological report can be supported.

Modifications

Although the embodiments of the present invention have been described above, the invention is not limited to the above description.

For example, in the information processing system 1 of the embodiment of the present invention, information related to radiological reports is classified by specific conditions according to the specialties of hospitals such as "hospital specializing in brain tumor" and "hospital specializing in cerebrovascular disease", and different support information DBs 122 and 123 are generated. However, the invention is not limited to the embodiment. It is also possible to distinguish information of the radiological reports on the basis of specific conditions according to the scale of a hospital such as "big hospital" and "small hospital" and generate different support information DBs 122 and 123.

Concretely, as the specific condition, there is a condition of whether or not the number of pieces of single-report element associated information transmitted from one terminal to the server 100 in a predetermined period lies in a predetermined value range. For example, a condition that the number of pieces of single-report element associated information transmitted from one terminal for one month is equal to or larger than a predetermined number (such as 300) or less than the predetermined number can be mentioned.

More specifically, the following configuration can be mentioned.

The analyzing unit 113 analyzes the number of pieces of single-report element associated information transmitted from each of the terminals 10, 20, and 30 for one month from the single-report element associated information accumulated in each of the terminals 10, 20, and 30 in the integrated DB 121. On the basis of the analysis result of the analyzing unit 113, when the number of pieces of the single-report element associated information sent from each of the terminals 10, 20, and 30 is equal to or larger than a predetermined number (for example, 300), the terminal managing unit 114 recognizes that the terminal satisfies the first specific condition. When the number is less than the predetermined number (for example, 300), the terminal managing unit 114 recognizes that the terminal satisfies the second specific condition. The recognition result is stored as the terminal management information 129 in the storage unit 120. For example, in the case where 500 pieces of single-report element associated information are transmitted from the terminal 10 to the server 100 for the period of one month, it is recognized that the terminal 10 satisfies the first specific condition. When 100 pieces of single-report element associated information are transmitted from each of the two terminals 20 and 30 to the server 100 for the period of one month, each of the terminals 20 and 30 is recognized as a terminal satisfying the second specific condition. In the specialization DB constructing unit 115, according to the terminal management information 129, the first support information DB 122 is generated on the basis of the single-report element associated information transmitted from the terminal 10 satisfying the first specific condition, and the second support information DB 123 is generated on the basis of the single-report element associated information transmitted from the two terminals 20 and 30 satisfying the second specific condition.

When such a configuration is employed, discrimination of the situations adapted to the use states of the terminals 10, 20, and 30 mounted in hospitals of different scales such as a large hospital and a small hospital can be performed from the viewpoint of the information amount. The mode of discriminating a hospital of a relatively large scale and a hospital of a relatively small scale from each other is not limited to the discriminating mode using the predetermined number of the single-report element associated information transmitted to the server 100 for one month. Various modes are considered such that, for example, when the number of pieces of information for one month lies in the range of 0 to 200, the hospital is discriminated as a small-scale hospital. When the number for one month lies in the range of 200 to 400, the hospital is discriminated as an intermediate-scale hospital. When the number for one month exceeds 400, the hospital is discriminated as a large-scale hospital.

If information such as the number of operations, the number of failures, and the number of successes can be obtained from the single-report element associated information, whether or not a specific condition is satisfied may be determined by the number of such information. In the case where the specialty or the like is known by an element belonging to a predetermined item such as a modality in the single-report element associated information, whether or not a specific condition is satisfied may be determined on the basis of such information.

Although whether or not each of terminals satisfies a specific condition is determined on the basis of the single-report element associated information in the foregoing embodiment, the invention is not limited to the embodiment. For example, whether or not a specific condition is satisfied may be determined on the basis of the identification information such as the ID, the name, password, or the like unique to the terminal. For example, when identification information which is given varies according to the specialty or scale of a hospital, whether or not a specific condition such as the specialty, scale, or the like of the hospital is satisfied can be easily determined on the basis of the identification information.

In the foregoing embodiment, the element associated network information constructing the support information DB corresponding to a specific condition is distributed only to a terminal satisfying the specific condition. However, the invention is not limited to the embodiment. For example, the invention may employ a configuration of distributing the element associated network information constructing the support information DB corresponding to the specific condition to all of the terminals 10, 20, and 30 without discriminating the terminals 10, 20, and 30 connected to the server 100 via the network line NTW. For example, with respect to the embodiment of the present invention, a configuration may be employed such that the element associated network information constructing the second support information DB 123 is distributed also to the terminals 10 and 20 satisfying the first specific condition, and the element associated network information constructing the first support information DB 122 is transmitted also to the terminal 30 satisfying the second specific condition. In the case where such a configuration is employed, it is sufficient to select the support information DB which is properly used on the terminals 10, 20, and 30 side.

In the foregoing embodiment, the system of reading an image obtained by radiation and generating a radiological report has been described. However, the invention is not limited to the system. The invention can be also applied to a system of generating other medical reports such as a nursing report and an incident report. Further, the invention can be also applied to generation of reports in fields other than the medial field such as a sales report. Further, the invention can be also applied to the fields other than reports.

Two concrete examples (1 and 2) of applying the invention to the fields other than the medical field and other than reports will be described below.

Concrete Example 1

The terminals 10, 20, and 30 are mounted in houses, and information obtained by associating a plurality of elements (element associated information) and sent to the server 100 is information obtained by associating elements belonging to items such as "staple food", "main dish", and "sub dish" related to a menu of food. When a "specific condition" determined on the server 100 side is set as "the ratio that the main dish is meat dish in one week is equal to or higher than a predetermined ratio", menus in which the preferences of each house are reflected can be provided by using a database generated by the above element associated information classified in accordance with the specific condition.

Concrete Example 2

The terminals 10, 20, and 30 are disposed in computer shops, and information obtained by associating a plurality of elements (element associated information) and sent to the server 100 is the details of a sold personal computer set, that is, information obtained by associating elements belonging to items such as "manufacturer", "the kind of an OS", "the kind of a CPU", "capacity of a memory", "capacity of a hard disk", "size of a display", and "the kind of a printer". When a "specific condition" determined on the server 100 side is set as "the ratio that the capacity of a hard disk is 100 GB or larger for a predetermined period", features of users (such as so-called light users or heavy users) which vary among shops are reflected and recommended products and the like can be proposed by using a database generated by the above element associated information classified in accordance with the specific condition.

Although only three terminals 10, 20, and 30 are shown in the foregoing embodiment, the number is not limited to three but may be any number as long as a plurality of terminals are provided.

Although the remark on a radiological report is in the form of a natural sentence such that "In T2, A high signal is recognized in the frontal lobe, and infarction is suspected" in the foregoing embodiment, the invention is not limited to the form. For example, a remark may be in a structured form in which elements are associated with the attribute items in advance like "imaging parameter: T2", "region: frontal lobe", "remark: high signal", and "disease name: infarction". In the case of employing such a form of a remark, the associated information generating function in the terminals 10, 20, and 30 is unnecessary. Thus, the functional configuration of the information processing system can be simplified, and time and the like required for the information process can be reduced.

In the foregoing embodiment, out of four functions (associated information generating function, support information generating function, information distributing function, and input support function), the associated information generating function and the input support function are provided for the terminals 10, 20, and 30. The support information generating function and the information distributing function are provided for the server 100. The invention however is not limited to the configuration. The four functions (associated information generating function, support information generating function, information distributing function, and input support function) may be properly shared by the server 100 and the terminals 10, 20, and 30. Further, another mode may be also considered such that the four functions (associated information generating function, support information generating function, information distributing function, and input support function) are substantially provided for one device and different support information DBs are provided for different users which can be identified by the user IDs or the like.

In the foregoing embodiment, the terminals 10, 20, and 30 mounted in different hospitals are connected to the server 100 via the network line NTW so as to be able to transmit/receive data. The invention is not limited to the configuration. For example, another configuration may be employed such that a plurality of terminals are connected to a server via a LAN or the like so as to be able to transmit/receive data in each of hospitals, and servers mounted in the hospitals are connected to the server 100 via the network line NTW so as to be able to transmit/receive data.

While the invention has been shown and described in detail, the foregoing description is in all aspects illustrative and not restrictive. It is therefore understood that numerous modifications and variations can be devised without departing from the scope of the invention.

What is claimed is:

1. An information processing system for supporting medical diagnosis comprising:
    a server; and
    a plurality of terminals, wherein each of said plurality of terminals includes:
        an obtaining unit that generates word/phrase associated information that includes words or phrases, wherein said obtaining unit associates, directly and/or indirectly, said words or said phrases with each other regarding medical diagnosis belonging to a plurality of classifications so as to generate said word/phrase associated information; and
        a transmitting unit for transmitting said word/phrase associated information to said server, and
    said server includes:
        a receiving unit for receiving said word/phrase associated information from each of said plurality of terminals;
        a network information generating unit, in the case where one or more terminals included in said plurality of terminals satisfies a specific condition, that generates network information, wherein said network information generating unit associates said words or said phrases respectively between said plurality of classifications on the basis of a plurality of pieces of said word/phrase associated information received from said one or more terminals; and
        a recognizing unit for recognizing that each of said plurality of terminals satisfies said specific condition based on a plurality of pieces of said word/phrase associated information transmitted from each of said plurality of terminals to said server.

2. The information processing system according to claim 1, wherein said server further comprises a distributing unit for distributing said network information to each of said plurality of terminals, and
    each of said plurality of terminals further includes a display control unit for performing a control so that a view of information obtained by associating words or phrases belonging to at least two classifications included in said plurality of classifications with each other between said at least two classifications is displayed on a display unit on the basis of entire network information or partial network information included in said network information.

3. The information processing system according to claim 2, wherein each of said plurality of terminals further comprises:
    an element designating unit for designating, as a report constructing element that constructs report information in accordance with a predetermined report model, one or more of said words or said phrases related to medical diagnosis for each of said at least two classifications included in said view in response to an operation of a user in a state where said view is displayed in said display unit; and
    a report generating unit for generating new report information in accordance with said predetermined report model based on said report constructing element.

4. The information processing system according to claim 3, wherein said report information includes radiological report information, and
    said plurality of classifications include a region, a remark, and a disease name.

5. The information processing system of claim 1, wherein said word/phrase associated information consists essentially of said words or said phrases.

6. The information processing system according to claim 1, wherein when a number of said plurality of pieces of said word/phrase associated information sent from one of said plurality of terminals to said server is included in a predetermined value range, said recognizing unit recognizes that said one of said plurality of terminals satisfies said specific condition.

7. The information processing system according to claim 1, wherein when proportion of said word/phrase associated information including a predetermined word or phrase in said plurality of pieces of word/phrase associated information sent from one of said plurality of terminals to said server is included in a predetermined value range, said recognizing unit recognizes that said one of said plurality of terminals satisfies said specific condition.

8. The information processing system according to claim 1, wherein said server transmits said network information to one of said plurality of terminals that satisfies said specific condition.

9. The information processing system according to claim 1, wherein said obtaining unit generates said word/phrase associated information by performing a predetermined information process including a language process on sentence information to extract one or more of said words or said phrases related to medical diagnosis belonging to each of said classifications from said sentence information and associate said extracted one or more of said words or said phrases related to medical diagnosis with each other.

10. The information processing system according to claim 9, wherein said language process includes a process based on information obtained by machine learning.

11. The information processing system according to claim 9, wherein said sentence information comprises a plurality of words and said extraction of said one or more of said words or phrases related to medical diagnosis is based on a pattern of said plurality of words.

12. An information processing system for supporting medical diagnosis comprising:
a server; and
a plurality of terminals, wherein each of said plurality of terminals includes:
an obtaining unit that generates word/phrase associated information that includes words or phrases, wherein said obtaining unit associates, directly and/or indirectly, said words or said phrases with each other regarding medical diagnosis belonging to a plurality of classifications so as to generate said word/phrase associated information; and
a transmitting unit for transmitting said word/phrase associated information to said server, and
said server includes:
a receiving unit for receiving said word/phrase associated information from each of said plurality of terminals;
a network information generating unit that generates first network information and second network information, wherein said network information generating unit associates said words or phrases respectively between said plurality of classifications based on a first plurality of pieces of word/phrase associated information received from a first class of said plurality of terminals satisfying a first specific condition included in said plurality of terminals, and wherein said network information generating unit associates said words or said phrases respectively between said plurality of classifications on the basis of a second plurality of pieces of word/phrase associated information received from a second class of said plurality of terminals satisfying a second specific condition included in said plurality of terminals; and
a recognizing unit for recognizing that each of said first class and second class of said plurality of terminals satisfies said first or second specific condition, respectively, based on a plurality of pieces of said word/phrase associated information transmitted from each of said plurality of terminals to said server.

13. The information processing system according to claim 12, wherein said server further comprises a distributing unit for distributing said first or second network information to each of said plurality of terminals.

14. The information processing system according to claim 12, wherein said server transmits said first network information to a first terminal satisfying said first specific condition in said plurality of terminals, and transmits said second network information to a second terminal satisfying said second specific information in said plurality of terminals.

15. The information processing system of claim 12, wherein said word/phrase associated information consists essentially of said words or said phrases.

* * * * *